US012809117B2

(12) United States Patent
Lee et al.

(10) Patent No.: US 12,809,117 B2
(45) Date of Patent: Nov. 24, 2026

(54) LENS DRIVING UNIT, CAMERA MODULE AND OPTICAL APPARATUS HAVING A MAGNET

(71) Applicant: LG INNOTEK CO., LTD., Seoul (KR)

(72) Inventors: Jun Taek Lee, Seoul (KR); Sang Ok Park, Seoul (KR); Byung Wook Son, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 37 days.

(21) Appl. No.: 18/968,686

(22) Filed: Dec. 4, 2024

(65) Prior Publication Data

US 2025/0093614 A1 Mar. 20, 2025

Related U.S. Application Data

(63) Continuation of application No. 18/313,660, filed on May 8, 2023, now Pat. No. 12,189,207, which is a (Continued)

(30) Foreign Application Priority Data

Apr. 29, 2015 (KR) ........................ 10-2015-0060353
Jun. 30, 2015 (KR) ........................ 10-2015-0092589
Jun. 30, 2015 (KR) ........................ 10-2015-0092590

(51) Int. Cl.
*G02B 7/08* (2021.01)
*G01D 5/14* (2006.01)
(Continued)

(52) U.S. Cl.
CPC ............... *G02B 7/08* (2013.01); *G01D 5/145* (2013.01); *G02B 27/646* (2013.01); *H04N 23/55* (2023.01); *H04N 23/57* (2023.01)

(58) Field of Classification Search
CPC ........ G02B 7/08; G02B 27/646; H04N 23/57; H04N 23/55; G01D 5/145
See application file for complete search history.

(56) References Cited

U.S. PATENT DOCUMENTS 8,836,177 B2 9/2014 Lee et al.
9,921,388 B2 3/2018 Park et al.
(Continued)

FOREIGN PATENT DOCUMENTS

CN 102819086 A 12/2012
CN 103676402 A 3/2014
(Continued)

OTHER PUBLICATIONS

Office Action dated Jul. 10, 2018 in U.S. Appl. No. 15/142,610.
(Continued)

*Primary Examiner* — Lin Ye
*Assistant Examiner* — Fayez A Bhuiyan
(74) *Attorney, Agent, or Firm* — SALIWANCHIK, LLOYD & EISENSCHENK

(57) ABSTRACT

A lens driving device is provided, the lens driving device including: a housing; a bobbin disposed at an inner side of the housing; a first driving part disposed on the bobbin; a second driving part disposed on the housing and facing the first driving part; a first mounting part disposed on the bobbin; a second mounting part disposed on the bobbin and disposed at an opposite side of the first mounting part based on a center of the bobbin; a first magnet disposed on the first mounting part; a sensor part sensing a position of the first magnet; and a second magnet disposed on the second mounting part.

19 Claims, 11 Drawing Sheets

Related U.S. Application Data continuation of application No. 16/690,386, filed on Nov. 21, 2019, now Pat. No. 11,714,255, which is a continuation of application No. 15/142,610, filed on Apr. 29, 2016, now Pat. No. 10,520,700.

(51) Int. Cl.

| | |
|---|---|
| ***G02B 27/64*** | (2006.01) |
| ***H04N 23/55*** | (2023.01) |
| ***H04N 23/57*** | (2023.01) |

(56) References Cited

U.S. PATENT DOCUMENTS

| | | | | |
|---|---|---|---|---|
| 9,958,634 | B2 | 5/2018 | Lee et al. | |
| 10,520,700 | B2 | 12/2019 | Lee et al. | |
| 12,189,207 | B2 * | 1/2025 | Lee | G02B 7/08 |
| 2008/0259467 | A1 | 10/2008 | Chung | |
| 2012/0026611 | A1 | 2/2012 | Hu et al. | |
| 2012/0147258 | A1 | 6/2012 | Park | |
| 2012/0229901 | A1 | 9/2012 | Moriya et al. | |
| 2012/0229926 | A1 | 9/2012 | Wade et al. | |
| 2012/0314308 | A1 | 12/2012 | Ikushima et al. | |
| 2013/0016428 | A1 | 1/2013 | Sugawara et al. | |
| 2014/0072289 | A1 * | 3/2014 | Lim | G03B 3/10 396/55 |
| 2014/0177056 | A1 | 6/2014 | Hayashi et al. | |
| 2015/0055220 | A1 | 2/2015 | Lim et al. | |
| 2015/0155768 | A1 | 6/2015 | Hsu et al. | |
| 2015/0177479 | A1 | 6/2015 | Lee et al. | |
| 2016/0154249 | A1 | 6/2016 | Yeo | |

FOREIGN PATENT DOCUMENTS

| | | | |
|---|---|---|---|
| CN | 203761238 | U | 8/2014 |
| CN | 104216199 | A | 12/2014 |
| JP | 2011-128529 | A | 6/2011 |
| JP | 2012-177753 | A | 9/2012 |
| JP | 2013-33179 | A | 2/2013 |
| JP | 2014-219675 | A | 11/2014 |
| JP | 2015-107054 | A | 6/2015 |
| JP | 2015-111295 | A | 6/2015 |
| KR | 10-2007-0048114 | A | 5/2007 |
| KR | 10-2008-0011639 | A | 2/2008 |
| KR | 10-2013-0003821 | A | 1/2013 |
| KR | 10-1440807 | B1 | 9/2014 |
| KR | 10-2014-0128906 | A | 11/2014 |

OTHER PUBLICATIONS

Office Action dated Mar. 21, 2018 in U.S. Appl. No. 15/142,610.
Notice of Allowance dated Aug. 20, 2019 in U.S. Appl. No. 15/142,610.
Office Action dated Nov. 25, 2019 in Chinese Application No. 201610284249.9.
Office Action dated Nov. 4, 2021 in Korean Application No. 10-2015-0060353.
Office Action dated Feb. 17, 2022 in Korean Application No. 10-2015-0092589.
Office Action dated Feb. 28, 2022 in Korean Application No. 10-2015-0092590.
Office Action dated Oct. 5, 2022 in U.S. Appl. No. 16/690,386.
Notice of Allowance dated Feb. 8, 2023 in U.S. Appl. No. 16/690,386.
Office Action dated May 20, 2023 in Chinese Application No. 202111144698.0.
Office Action dated May 27, 2023 in Chinese Application No. 202111142840.8.
Office Action dated Jul. 17, 2023 in Korean Application No. 10-2022-0145383.
Office Action dated Sep. 14, 2023 in Korean Application No. 10-2023-0040812.
Office Action dated Sep. 14, 2023 in Korean Application No. 10-2023-0028066.
Office Action dated Jul. 19, 2024 in Korean Application No. 10-2023-0028066.
Office Action dated Jul. 23, 2024 in Korean Application No. 10-2023-0040812.
Office Action dated May 8, 2024 in U.S. Appl. No. 18/313,660.
Notice of Allowance dated Sep. 5, 2024 in U.S. Appl. No. 18/313,660.
U.S. Appl. No. 18/313,660, filed May 8, 2023.
U.S. Appl. No. 16/690,386, filed Nov. 21, 2019, now U.S. Pat. No. 11,714,255, issued Aug. 1, 2023.
U.S. Appl. No. 15/142,610, filed Apr. 29, 2016, now U.S. Pat. No. 10,520,700, issued Dec. 31, 2019.

* cited by examiner (a)

(b)

(a)

(b)

(c)

(d)

LENS DRIVING UNIT, CAMERA MODULE AND OPTICAL APPARATUS HAVING A MAGNET

CROSS REFERENCE TO RELATED APPLICATIONS

This application is a continuation of U.S. application Ser. No. 18/313,660, filed May 8, 2023; which is a continuation of U.S. application Ser. No. 16/690,386, filed Nov. 21, 2019, now U.S. Pat. No. 11,714,255, issued Aug. 1, 2023; which is a continuation of U.S. application Ser. No. 15/142,610, filed Apr. 29, 2016, now U.S. Pat. No. 10,520,700, issued Dec. 31, 2019; which claims priority under 35 U.S.C. § 119 to Korean Patent Application Nos. 10-2015-0060353, filed Apr. 29, 2015; 10-2015-0092589, filed Jun. 30, 2015; and 10-2015-0092590, filed Jun. 30, 2015, all of which are hereby incorporated by reference in their entirety.

TECHNICAL FIELD

Exemplary embodiments of the present disclosure relate to a lens driving device, a camera module, and an optical apparatus.

BACKGROUND

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of photographing an object as a still image or a moving picture.

Meanwhile, camera modules having AF (Auto Focus) functions are popularly used. Here, an auto focus feedback is required to be used for more precise AF control.

However, the conventional camera module having the auto focus feedback function suffers from disadvantages in that the sensing structure for sensing a position of a bobbin affects a posture of the bobbin to generate a static tilt and a dynamic tilt.

BRIEF SUMMARY

Technical Challenge

The present disclosure is to provide a lens driving device directed to solve the aforementioned problems or disadvantages by comprising a first magnet for sensing a position of a bobbin and a second magnet establishing magnetic force equilibrium with the first magnet.

In addition, the present disclose is to provide a camera module and an optical apparatus including precise auto focus function and auto focus feedback function using the lens driving device.

Technical problems to be solved by the present disclosure are not restricted to the above-mentioned, and any other technical problems not mentioned so far will be clearly appreciated from the following description by skilled in the art.

Technical Solution

An object of the present disclosure is to solve at least one or more of the above problems and/or disadvantages in whole or in part and to provide at least the advantages described hereinafter.

In order to achieve at least the above objects, in whole or in part, and in accordance with the purposes of the present disclosure, as embodied and broadly described, and in one general aspect of the present disclosure, there is provided a lens driving device, the camera module comprising: a housing; a bobbin disposed at an inner side of the housing; a first driving part disposed on the bobbin; a second driving part disposed on the housing and facing the first driving part; a first mounting part disposed on the bobbin; a second mounting part disposed on the bobbin and disposed at an opposite side of the first mounting part based on a center of the bobbin; a first magnet disposed on the first mounting part; a sensor part sensing a position of the first magnet; and a second magnet disposed on the second mounting part.

In some exemplary embodiments, the sensor part may be disposed at the housing, the second driving part may include a third magnet being spaced part from the first magnet and the second magnet, and the sensor part and the third magnet may be disposed on a same plane of the housing.

In some exemplary embodiments, the bobbin may include a first outer circumferential surface, a second outer circumferential surface, and a first edge part formed by encounter of the first outer circumferential surface and the second outer circumferential surface, the first magnet may be disposed at the first outer circumferential surface, and the first magnet may be disposed biased to the first edge part.

In some exemplary embodiments, the bobbin may include a third outer circumferential surface facing the first outer circumferential surface, a fourth outer circumferential surface facing the second outer circumferential surface, and a second edge part formed by encounter of the third outer circumferential surface and the fourth outer circumferential surface, the second magnet may be disposed at the third outer circumferential surface, and the second magnet may be disposed biased to the second edge part.

In some exemplary embodiments, the first magnet and the second magnet may be spaced apart at a distance corresponding to a center of the bobbin.

In some exemplary embodiments, the center of the bobbin may be disposed on a virtual line connecting the first magnet and the second magnet.

In some exemplary embodiments, the first magnet and the second magnet may be in shape and size corresponding to those of each other.

In some exemplary embodiments, the lens driving device may further comprise: a cover member, made of a metallic material, disposing the bobbin and the housing at an inner space; and a support member elastically supporting the bobbin dynamically movable with respect to the housing, wherein the first magnet and the second magnet may be spaced apart at a distance corresponding to the first driving part, the second driving part, the cover member, or the support member.

In some exemplary embodiments, the lens driving device may further comprise: a lower support member elastically connecting a lower part of the bobbin and a lower part of the housing, wherein the first driving part includes a coil, and the lower support member may be provided in a pair, where each of the pair of the lower support member may be connected to the coil so as to be supplied with electric power from an external source for delivery.

In some exemplary embodiments, the first mounting part may be formed by being recessed on an outer circumferential surface at one side of the bobbin, and the second mounting part may be formed by being recessed on an outer circumferential surface at another side of the bobbin.

In some exemplary embodiments, the first driving part and the first magnet may be disposed to avoid overlapping in a horizontal direction.

In some exemplary embodiments, the lens driving device may further comprise an adhesive bonding the first magnet to the first mounting part.

In some exemplary embodiments, the housing may include a driving part coupling part coupled with the second driving part and a sensor mounting part disposed with the sensor part.

In some exemplary embodiments, the housing may include four lateral surfaces, the driving part coupling part may be disposed one on each of the four lateral surfaces, and the driving part coupling part and the sensor mounting part may be disposed together on one lateral surface among the four lateral surfaces of the housing.

In some exemplary embodiments, a size of the driving part coupling part disposed on one lateral surface of the housing may be smaller than a size of the driving part coupling part disposed on another surface adjacent to the one lateral surface.

In some exemplary embodiments, the driving part coupling part disposed on one lateral surface of the housing may be disposed biased to an edge formed by encounter of the one lateral surface and another lateral surface.

In some exemplary embodiments, the lens driving device may further comprise: a flexible printed circuit board mounted with the sensor part; and a cover member disposing the bobbin and the housing at an inner space, wherein the flexible printed circuit board may be disposed between the housing and the cover member.

In another general aspect of the present disclosure, there is provided a lens driving device, the lens driving device comprising: a housing; a bobbin disposed at an inner side of the housing; a driving coil disposed on the bobbin; a driving magnet disposed on the housing and facing the driving coil; a first mounting part disposed on the bobbin; a second mounting part disposed on the bobbin and disposed at an opposite side of the first mounting part based on a center of the bobbin; a sensing magnet disposed on the first mounting part; a Hall sensor sensing a position of the first magnet; and a compensating magnet disposed on the second mounting part, wherein the Hall sensor, the driving coil, and the sensing magnet may be overlapped.

In some exemplary embodiments, the camera module may further comprise: a controller configured to move the bobbin with respect to the housing by applying electric power to the driving coil, wherein the controller may control the electric power applied to the driving coil by receiving a position of the sensing magnet sensed by the Hall sensor.

In still another general aspect of the present disclosure, there is provide an optical apparatus, the optical apparatus comprising: a housing; a bobbin disposed at an inner side of the housing; a first driving part disposed on the bobbin; a second driving part disposed on the housing and facing the first driving part; a first mounting part disposed on the bobbin; a second mounting part disposed on the bobbin and disposed at an opposite side of the first mounting part based on a center of the bobbin; a first magnet disposed on the first mounting part; a sensor part sensing a position of the first magnet; and a second magnet disposed on the second mounting part.

In still another general aspect of the present disclosure, there is provided a lens driving device, the lens driving device comprising: a first driver including a first driving part and a bobbin disposed with the first driving part; a second driver including a second driving part configured to move the first driving part through electromagnetic interaction with the first driving part, and a housing disposed with the second driving part; a third driving part configured to move the second driving part through electromagnetic interaction with the second driving part; a first magnet disposed at one side of the bobbin; a sensor part disposed at the housing, and sensing a position of the first magnet; and a second magnet disposed at another side of the bobbin.

In some exemplary embodiments, the first magnet and the second magnet may be disposed to avoid facing the second driving part.

In some exemplary embodiments, the housing may include a first lateral surface, a second lateral surface adjacent to the first lateral surface, and a corner part formed by encounter of the first lateral surface and the second lateral surface.

In some exemplary embodiments, the bobbin may include a first outer circumferential surface facing the first lateral surface, a second outer circumferential surface facing the second lateral surface, and a third circumferential surface facing the corner part, wherein the first magnet may disposed at the third outer circumferential surface.

In some exemplary embodiments, the housing may further include a third lateral surface adjacent to the second lateral surface.

In some exemplary embodiment, the second lateral surface may include a first driving magnet disposed at the first lateral surface, a second driving magnet disposed at the second lateral surface, a third driving magnet disposed at the third lateral surface, wherein a separating distance between the first driving magnet and the second driving magnet is longer than a separating distance between the second driving magnet and the third driving magnet.

In some exemplary embodiments, the housing may include a first lateral surface, a second lateral surface adjacent to the first lateral surface, and a corner part formed by encounter of the first lateral surface and the second lateral surface.

In some exemplary embodiments, the bobbin may include a first outer circumferential surface facing the first lateral surface, a second outer circumferential surface facing the second lateral surface, and a third circumferential surface facing the corner part, wherein the first magnet may disposed at the third outer circumferential surface, and the first magnet may be disposed biased to the third outer circumferential surface.

In some exemplary embodiments, the second driving part may include a first driving magnet disposed at the first lateral surface and a second driving magnet disposed at the second lateral surface, wherein the first driving magnet may be smaller than the second driving magnet.

In some exemplary embodiments, the first magnet may be spaced apart from the first driving part in a direction corresponding to an optical axis direction of a lens module coupled at an inner side of the bobbin.

In some exemplary embodiments, the sensor part may be spaced apart from the second driving part in a direction corresponding to an optical axis direction of a lens module coupled at an inner side of the bobbin.

In some exemplary embodiments, an orthographic projection of the first magnet toward the housing may not be overlapped with the second driving part.

In some exemplary embodiments, the first magnet may be disposed at an accommodating groove formed on the bobbin.

In some exemplary embodiments, the accommodating groove may be of a bottom-opening type or a top-opening type.

In some exemplary embodiments, the first magnet may have an N-pole and an S-pole disposed at an upper surface and a lower surface of the first magnet, respectively.

In some exemplary embodiments, the accommodating groove may be of a top-and-bottom closing type formed by a part of the outer circumferential surface internally recessed.

In some exemplary embodiments, the first magnet may have an N-pole and an S-pole disposed at lateral surfaces of the first magnet.

In some exemplary embodiments, the first magnet and the second magnet may be spaced at a distance corresponding to a center of the bobbin.

In some exemplary embodiments, a center of the bobbin may be disposed on a virtual line connecting the first magnet and the second magnet.

In some exemplary embodiments, the first magnet and the second magnet may be in shape and size corresponding to those of each other.

In some exemplary embodiments, the first magnet and the second magnet may be disposed to establish a magnetic force equilibrium with each other.

In still another general aspect of the present disclosure, there is provided a camera module, the camera module comprising: a first driver including a first driving part and a bobbin disposed with the first driving part; a second driver including a second driving part configured to move the first driving part through electromagnetic interaction with the first driving part, and a housing disposed with the second driving part; a third driving part configured to move the second driving part through electromagnetic interaction with the second driving part; a first magnet disposed at one side of the bobbin; a sensor part disposed at the housing, and sensing a position of the first magnet; and a second magnet disposed at another side of the bobbin.

In some exemplary embodiments, the first driving part may include a coil.

In some exemplary embodiments, the camera module may further comprise a controller configured to move the first driver with respect to the second driver by applying electric power to the coil, wherein the controller may control the electric power applied to the coil by receiving a position of the first magnet sensed by the sensor part.

In still another general aspect of the present disclosure, there is provided an optical apparatus, the optical apparatus comprising: a main body, a display unit configured to display information by being arranged at a surface of the main body, and a camera module configured to photograph a picture or a motion picture by being installed at the main body, wherein the camera module may include: a first driver including a first driving part and a bobbin disposed with the first driving part; a second driver including a second driving part configured to move the first driving part through electromagnetic interaction with the first driving part, and a housing disposed with the second driving part; a third driving part configured to move the second driving part through electromagnetic interaction with the second driving part; a first magnet disposed at one side of the bobbin; a sensor part disposed at the housing, and sensing a position of the first magnet; and a second magnet disposed at another side of the bobbin.

In still another general aspect of the present disclosure, there is provided a lens driving device, the lens driving device comprising: a first driver including a first driving part and a bobbin disposed with the first driving part; a second driver including a second driving part configured to move the first driving part through electromagnetic interaction with the first driving part, and a housing disposed with the second driving part; and a third driving part configured to move the second driving part through electromagnetic interaction with the second driving part, wherein the second driving part may include a first driving magnet, a second driving magnet disposed neighboring to the first driving magnet, a third driving magnet disposed neighboring to the second driving magnet, and a fourth driving magnet disposed neighboring to the third driving magnet, wherein a size of the first driving magnet may be different from a size of the second driving magnet.

In some exemplary embodiments, an encountering angle between a virtual line connecting a center of the first driving magnet to a center of the housing and a virtual line connecting a center of the second driving magnet to a center of the housing may form an acute angle or an obtuse angle.

In some exemplary embodiments, a first separating distance between the first driving magnet and the second driving magnet may be different from a second separating distance between the second driving magnet and the third driving magnet.

In some exemplary embodiments, the fourth driving magnet may be disposed differently from the first driving magnet and the third driving magnet, wherein a separating distance between the third driving magnet and the fourth driving magnet may correspond to the first separating distance, and a separating distance between the fourth driving magnet and the first driving magnet may correspond to the second separating distance.

In some exemplary embodiments, the first driving magnet may have a thickness and a height same as those of the second driving magnet, and may have a width different from that of the second driving magnet.

In some exemplary embodiments, the lens driving device may include a first magnet disposed at one side of the bobbin; and a sensor part disposed at the housing and sensing a position of the first magnet, wherein the first magnet may be disposed facing a first separating space forming the first separating distance, and the first separating distance may be longer that the second separating distance.

In some exemplary embodiments, the first magnet may be disposed to avoid facing the second driving part.

In some exemplary embodiments, the housing may include a first lateral surface disposed with the first driving magnet, a second lateral surface disposed with the second driving magnet, and a corner part formed by encounter of the first lateral surface and the second lateral surface, wherein the first magnet may be disposed facing the corner part.

In some exemplary embodiments, the housing may include a first lateral surface disposed with the first driving magnet, a second lateral surface disposed with the second driving magnet, and a corner part formed by encounter of the first lateral surface and the second lateral surface, wherein the first magnet may be disposed facing the corner part, and an orthographic projection of the first magnet toward the first lateral surface may not be overlapped with the first driving magnet.

In some exemplary embodiments, the lens driving device may include a second magnet disposed at another side of the bobbin.

In some exemplary embodiments, the first magnet and the second magnet may be spaced apart at a distance corresponding to a center of the bobbin.

In some exemplary embodiments, the center of the bobbin may be disposed on a virtual line connecting the first magnet and the second magnet.

In some exemplary embodiments, the first magnet and the second magnet may be in shape and size corresponding to those of each other.

In some exemplary embodiments, the first magnet and the second magnet may be disposed to establish a magnetic force equilibrium or a weight equilibrium with each other. In still another general aspect of the present disclosure, there is provided a camera module, the camera module comprising: a first driver including a first driving part and a bobbin disposed with the first driving part; a second driver including a second driving part configured to move the first driving part through electromagnetic interaction with the first driving part, and a housing disposed with the second driving part; and a third driving part configured to move the second driving part through electromagnetic interaction with the second driving part, wherein the second driving part may include a first driving magnet, a second driving magnet disposed neighboring to the first driving magnet, a third driving magnet disposed neighboring to the second driving magnet, and a fourth driving magnet disposed neighboring to the third driving magnet, wherein a size of the first driving magnet may be different from a size of the second driving magnet.

In some exemplary embodiments, a first separating distance between the first driving magnet and the second driving magnet may be different from a second separating distance between the second driving magnet and the third driving magnet.

In some exemplary embodiments, the camera module may include a first magnet disposed at one side of the bobbin; and a sensor part disposed at the housing and sensing a position of the first magnet, wherein the first magnet may be disposed facing a first separating space forming the first separating distance, and the first separating distance may be longer that the second separating distance.

In some exemplary embodiments, the first driving part may include a coil.

In some exemplary embodiments, the camera module may further comprise a controller configured to move the first driver with respect to the second driver by applying electric power to the coil, wherein the controller may control the electric power applied to the coil by receiving a position of the first magnet sensed by the sensor part.

In still another general aspect of the present disclosure, there is provided an optical apparatus, the optical apparatus comprising: a main body, a display unit configured to display information by being arranged at a surface of the main body, and a camera module configured to photograph a picture or a motion picture by being installed at the main body, wherein the camera module may include: a first driver including a first driving part and a bobbin disposed with the first driving part; a second driver including a second driving part configured to move the first driving part through electromagnetic interaction with the first driving part, and a housing disposed with the second driving part; and a third driving part configured to move the second driving part through electromagnetic interaction with the second driving part, wherein a size of the first driving magnet may be different from a size of the second driving magnet.

Advantageous Effect

Precise AF (Auto Focus) function, OIS (Optical Image Stabilization) function, AF feedback function, and/or OIS feedback function can be provided in some exemplary embodiments of the present disclosure.

DETAILED DESCRIPTION

Figure 1:
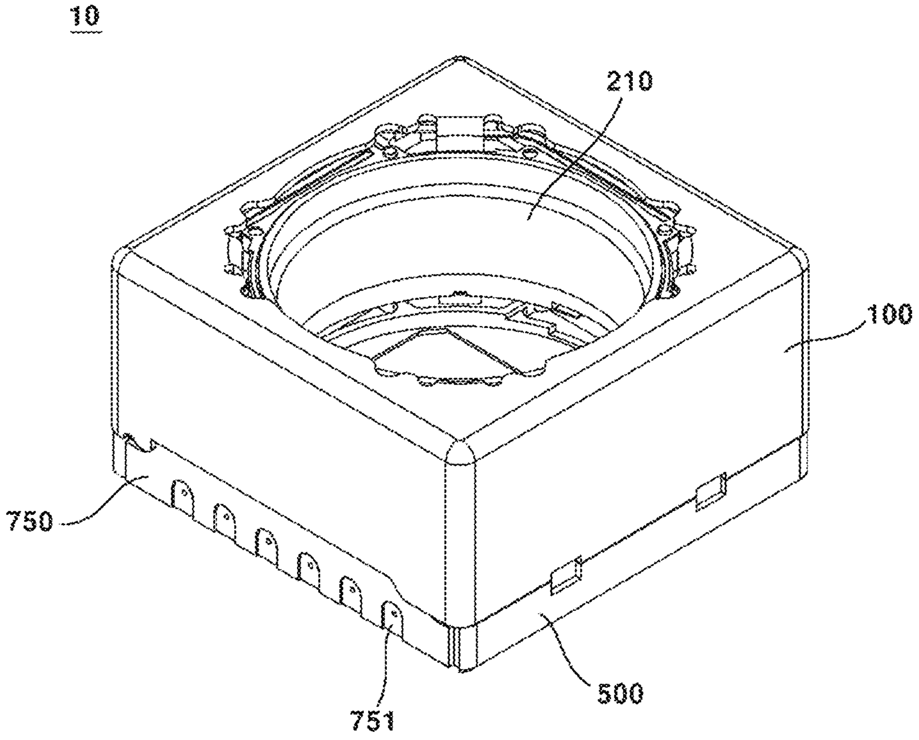
FIG. 1 is a perspective view illustrating a lens driving device according to an exemplary embodiment of the present disclosure.

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "PCB" is an acronym for "Printed Circuit Board", and the term "FPCB" is an acronym for "Flexible Printed Circuit Board".

Hereinafter, a structure of an optical apparatus according to an exemplary embodiment of the present disclosure will be described.

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to an exemplary embodiment of the present disclosure may include a main body (not illustrated), a display unit (not illustrated) configured to display information by being arranged at a surface of the main body, and a camera (not illustrated) including a camera module (not illustrated) configured to photograph a picture or a motion picture by being installed at the main body.

Hereinafter, a structure of the camera module will be described.

The camera module may further include a lens driving device (10), a lens module (not illustrated), an infrared cut-off filter (not illustrated), a PCB (Printed Circuit Board) (not illustrated), an image sensor (not illustrated), and a controller (not illustrated).

The lens module may include at least one lens (not illustrated) and a lens barrel accommodating the at least one lens. However, one structure of the lens module is not limited to the lens barrel, but any kind of holder structure capable of supporting the at least one lens may be available. The lens module may move along with a lens driving device (10) by being coupled to the lens driving device (10). As an example, the lens module may be screw-coupled to the lens driving device (10). As another example, the lens module may be coupled to the lens driving device (10) using an adhesive (not illustrated). As still another example, the lens module may be coupled to an inner side of the lens driving device (10). Meanwhile, light that has passed through the lens module may be irradiated to an image sensor.

The infrared cut-off filter may block light in an infrared area from being incident on the image sensor. As an example, the infrared cut-off filter may be disposed between the lens module and the image sensor. The infrared cut-off filter may be installed at a base (500) to be described hereinafter. The infrared cut-off filter may be coupled to a holder member (not illustrated). The infrared cut-off filter may be installed at a center hole (510) formed on a center portion of the base (500). As an exemplary embodiment, the infrared cut-off filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

The PCB (Printed Circuit Board) may support the lens driving device (10). The image sensor may be mounted on the PCB. As an example, the lens driving device (10) may be disposed at an outer side of an upper surface of the PCB, and the image sensor may be disposed at an external side of an upper surface of the PCB. Through such structure, the light that has passed through the lens module coupled at an inner side of the lens actuating unit may be irradiated to the image sensor mounted on the PCB. The PCB may supply electric power to the lens driving device (1010). Meanwhile, a controller for controlling the lens driving device (1010) may be disposed at the printed circuit board.

The image sensor may be mounted on the PCB. The image sensor may be disposed to have the same optical axis with the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted on the printed circuit board. The controller may be disposed at an external side of the lens driving device (10). Alternatively, controller may be disposed at an internal side of the lens driving device (10). The controller may control direction, intensity and amplitude of electrical current supplied to each structural element forming the lens driving device (10). The controller may control the lens driving device (10) to perform at least any one of AF (Auto Focus) function or OIS (Optical Image Stabilization) function of the camera module. That is, the controller may control the lens driving device (10) to move the lens module in an optical axis direction or in a direction perpendicular to the optical axis direction, or to tilt the lens module. Furthermore, the controller may perform feedback control of the AF function and the OIS function. In particular, the controller may receive a position of a first magnet (710) sensed by a sensor part (730) to control electric power applied to a first driving part (220) or a second driving part (320).

Hereinafter, a structure of the lens driving device (10) will be described in detail with reference to the enclosed drawings.

Figure 2:
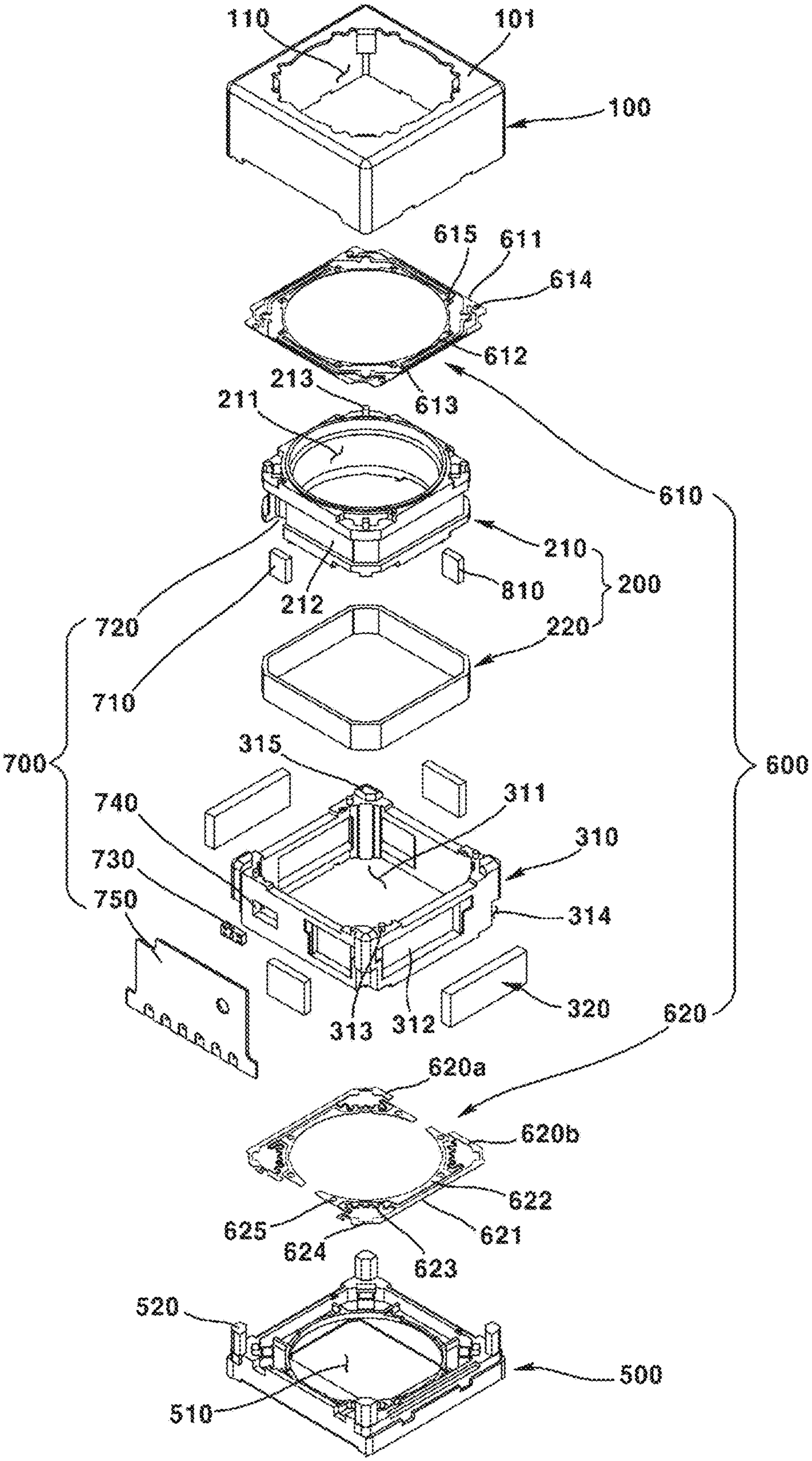
FIG. 2 is an exploded perspective view illustrating a lens driving device according to an exemplary embodiment of the present disclosure.
Figure 3:
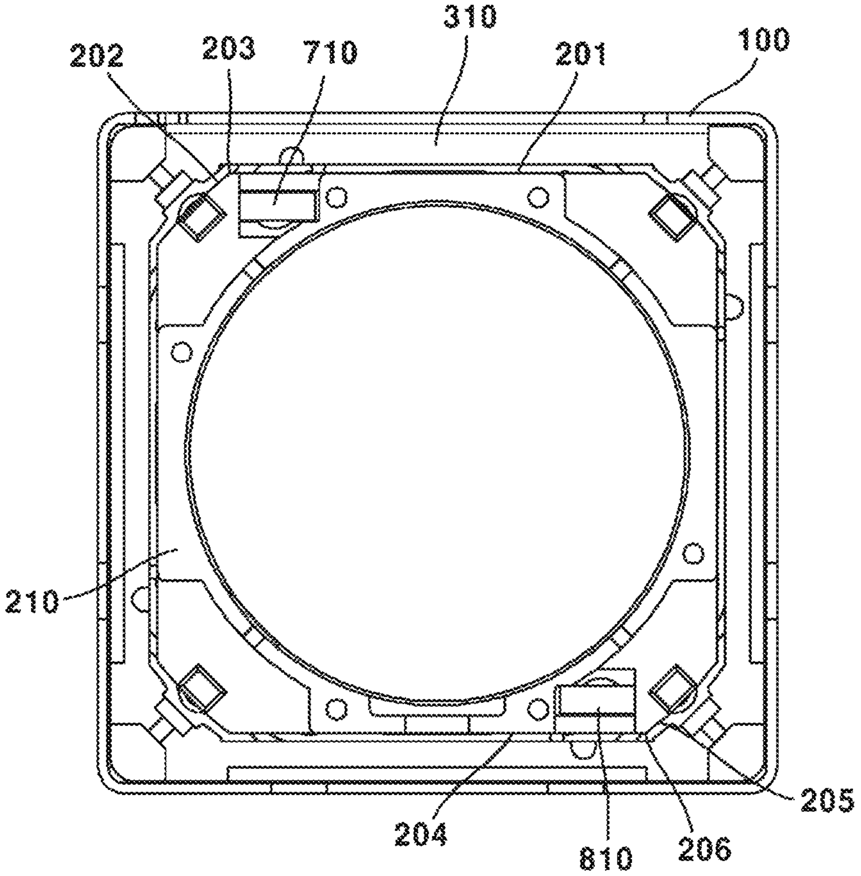
FIG. 3 is a bottom view illustrating a lens driving device according to an exemplary embodiment of the present disclosure.
Figure 4:
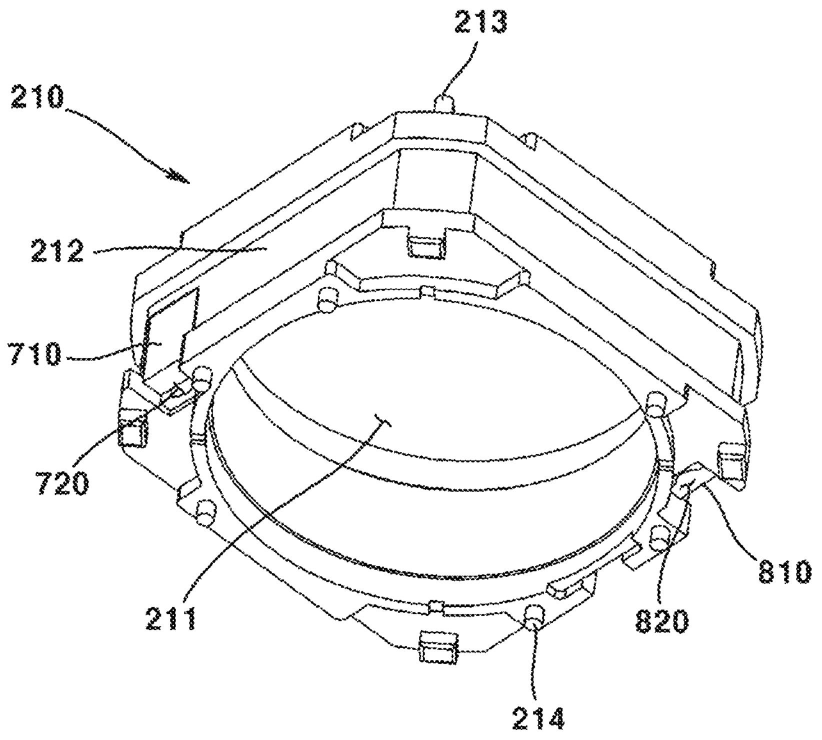
FIG. 4 is an exploded perspective view illustrating a bobbin and associated structure of a lens driving device according to an exemplary embodiment of the present disclosure.
Figure 5:
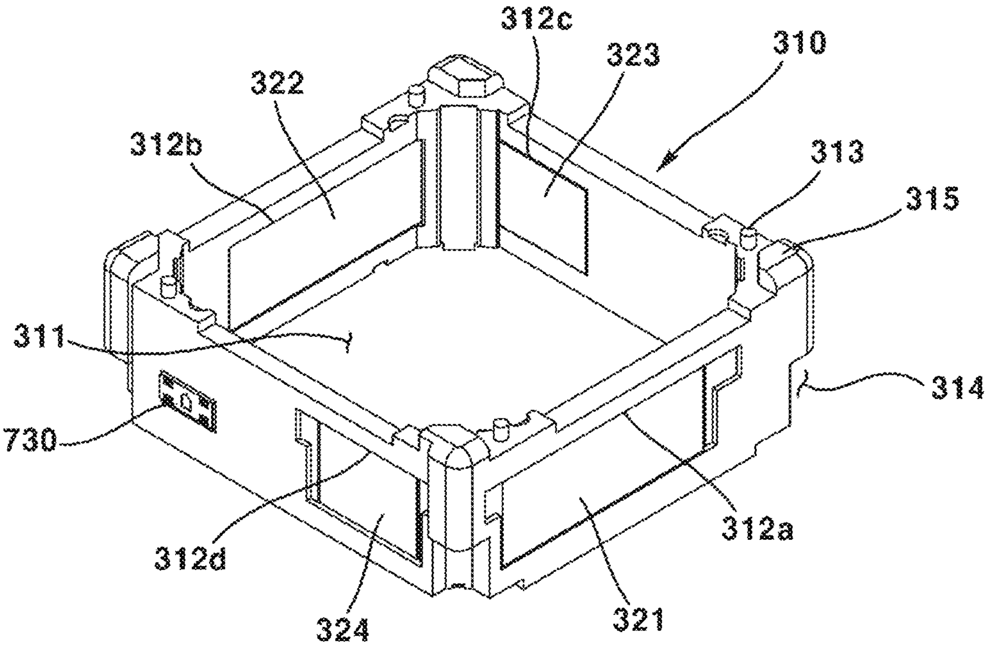
FIG. 5 is an exploded perspective view illustrating a housing and associated structure of a lens driving device according to an exemplary embodiment of the present disclosure.

FIG. 1 is a perspective view illustrating a lens driving device according to an exemplary embodiment of the present disclosure; FIG. 2 is an exploded perspective view illustrating a lens driving device according to an exemplary embodiment of the present disclosure; FIG. 3 is a bottom view illustrating a lens driving device according to an exemplary embodiment of the present disclosure; FIG. 4 is an exploded perspective view illustrating a bobbin and associated structure of a lens driving device according to an exemplary embodiment of the present disclosure; and FIG. 5 is an exploded perspective view illustrating a housing and associated structure of a lens driving device according to an exemplary embodiment of the present disclosure.

Referring FIGS. 1 through 5, the lens driving device (10) according to an exemplary embodiment of the present disclosure may include a cover member (100), a driver (200), a stator (300), a base (500), a support member (600), and a sensing unit (700). Alternatively, at least one of the cover member (100), the driver (200), the stator (300), the base (500), the support member (600), and the sensing unit (700) may be omitted in the lens driving device (10) according to an exemplary embodiment of the present disclosure.

The cover member (100) may form an external appearance of the lens driving device (10). For example, the cover member (100) may be formed in a shape of a hexahedron of which lower portion is opened, but not limited hereto. The cover member (100) may include an upper surface (101) and a lateral surface (102) extended downward form an outer side of the upper surface (101). Meanwhile, the cover member (100) may be installed at an upper portion of the base (500). The driver (200), the stator (300), and the support member (600) may be disposed at an internal space formed by the cover member (100) and the base (500). In addition, the cover member (100) may be coupled to the base (500) with an inner lateral surface of the cover member (100) closely adhered to a part or a whole of a lateral surface of the base (500). Through this structure, the cover member (100) may protect internal components from external impacts and inhibit penetration of external pollutants as well.

The cover member (100) may be formed of metallic material. In particular, the cover member (100) may be provided as a metallic plate. In this case, the cover member (100) may block electronic interference. That is, the cover member (100) may block electromagnetic wave generated outside of the lens driving device (10) from being introduced in the cover member (100). In addition, the cover member (100) may block electromagnetic wave generated inside of the lens driving device (10) from being released out of the cove member (100). However, the material forming the cover member (100) is not limited hereto.

The cover member (100) may include an opening (110) formed on an upper surface and exposing the lens module. The opening (110) may be formed in a shape corresponding to that of the lens module. That is, the light incident through the opening (110) may pass through the lens module. Meanwhile, the light that has passed through the lens module may be delivered to the image sensor.

The driver (200) may include a bobbin (210) and a first driving part (220). The driver (200) may be coupled to a lens module that is a component of a camera module. That is, the lens module may be disposed at an inner side of the driver (200). In other words, an inner circumferential surface of the driver (200) may be couple to an outer circumferential surface of the lens module. Meanwhile, the driver (200) may dynamically move integrally with the lens module through an interaction with the stator (300). That is, the driver (200) may move the lens module.

The driver (200) may include a bobbin (210). In addition, the driver (200) may include a first driving part (220) coupled to the bobbin (210).

The bobbin (210) may be coupled to the lens module. In particular, an outer circumferential surface of the lens module may be coupled to an inner circumferential surface of the bobbin (210). Meanwhile, the first driving part (220) may be coupled to the bobbin (210). In addition, a lower portion of the bobbin (210) may be coupled to a lower support member (620), and an upper portion of the bobbin (210) may be coupled to an upper support member (610). The bobbin (210) may be disposed at an inner side of the housing (310). The bobbin (210) may dynamically move relative to the housing (310).

The bobbin (210) may include a lens coupling part (211) formed at an inner side of the bobbin (210). The lens module may be coupled to the lens coupling part (211). A screw thread may be formed on an inner circumferential surface of the lens coupling part (211), in a shape corresponding to that of a screw thread formed on an outer circumferential surface of the lens module. That is, the outer circumferential surface of the lens module may be coupled to the inner circumferential surface of the lens coupling part (211).

The bobbin (210) may include a driving part coupling part (212) guiding the first driving part (220) to be wound or installed. The driving part coupling part (212) may be integrally formed with an outer lateral surface of the bobbin (210). In addition, the driving part coupling part (212) may be formed consecutively along an outer circumferential surface of the bobbin (210). Alternatively, the driving part coupling part (212) may be formed by being spaced at a predetermined interval along an outer circumferential surface of the bobbin (210).

The driving part coupling part (212) may include a recessed part formed by a part of an outer lateral surface of the bobbin (210) being recessed. Meanwhile, the driving part coupling part (212) may include a staircase part formed by the recessed part. The first driving part (220) may be disposed at the recessed part. The first driving part (220) disposed at the recessed part may be supported by the staircase part to be fixed.

The bobbin (210) may include an upper coupling part (213) coupled to an upper support member (610). The upper coupling part (213) may be coupled to an inner coupling part (615) of the upper support member (610). As an example, the upper coupling part (213) provided as a protrusion may be coupled by being inserted in the inner coupling part (625) provided as a groove. Meanwhile, a protrusion may be provided at the upper support member (610) and a groove may be formed at the bobbin (210), and these two components may be couple to each other.

As illustrated in FIG. 2, the bobbin (210) may include total four upper coupling part (213). Meanwhile, the bobbin (210) may include a lower coupling part (214) coupled to the lower support member (620). The lower coupling part (214) formed at the lower portion of the bobbin (210) may be coupled to the inner coupling part (625) of the lower support member (620). According to an exemplary embodiment of the present disclosure, the lower coupling part (214) provided as a protrusion may be coupled by being inserted in the inner coupling part (625) that is provided as a groove.

The first driving part (220) may be disposed facing the second driving part (320) of the stator (300). The first driving part (220) may move the bobbin (210) with respect to the housing (310), through electromagnetic interaction with the second driving part (320). The first driving part (220) may include a coil. The coil may be wound on an outer surface of the bobbin (210), by being guided by the driving part coupling part (212).

In addition, the coil may include four independent coils, of which two adjacent coils may form a 90 degree angle to be arranged at an outer surface of the bobbin (210). In a case where the first driving part (220) includes a coil, the electric power supplied to the coil may be supplied through the lower support member (620). Here, the lower support member (620) may be separately provided in a pair. Meanwhile, the first driving part (220) may include a pair of lead cables (not illustrated) for electric power supply. In this case, each of the pair of lead cables may be respectively coupled to the pair of the lower support members (620). Meanwhile, an electromagnetic field may be formed around the coil, when the electric power is supplied to the coil. In addition, the first driving part (220) may include a magnet. In such case, the second driving part (320) may be provided as a coil.

The stator (300) may be disposed at an outer side of the driver (200) by facing the driver (200). The stator (300) may be supported by the base (500) disposed at a lower side. The stator (300) may be disposed at an internal space of the cover member (100).

The stator (300) may include a housing (310) disposed at an outer side of the bobbin (210). In addition, the stator (300) may include a second driving part (320) that is disposed facing the first driving part (220) and fixed to the housing (310).

The housing (310) may be formed in shape corresponding to an inner lateral surface of the cover member (100) forming an external appearance of the lens driving device (10). In addition, the housing (310) may be formed of an insulated material, and may be implemented as an injection molding material, in consideration of productivity. The housing (310) may be arranged to be spaced apart at a predetermined distance from the cover member (100), as a movable component for OIS (Optical Image Stabilization) operation.

Alternatively, in the AF (Auto Focus) model, the housing (310) may be fixed on the base (500). In addition, in the AF model, the housing (310) may be omitted, and a magnet operating as the second driving part (320) may be fixed to the cover member (100).

In addition, upper and lower sides of the housing (310) may be opened to accommodate the driver (200) movable in up/downward directions. The housing (310) may internally include an inner space (311), where upper and lower sides of the inner space (311) are opened. The driver (200) may be movably disposed at the inner space (311). That is, the inner space (311) may be provided in a shape corresponding to a shape of the driver (200). In addition, an outer circumferential surface of the inner space (311) may be disposed spacing apart from an outer circumferential surface of the driver (200).

The housing (310) may include a driving part coupling part (312) at a lateral surface of the housing (310), where the driving part coupling part (312) may be formed in a shape corresponding to a shape of the second driving part (320) to accommodate the second driving part (320). That is, the driving part coupling part (312) may accommodate the second driving part (320) and fix the second driving part (320). Meanwhile, the driving part coupling part (312) may be disposed on an inner circumferential surface or an outer circumferential surface of the housing (310).

In the camera module according to an exemplary embodiment of the present disclosure, as illustrated in FIGS. 2 and 5, the driving part coupling part (312) of the housing (310) may include four driving part coupling parts (312*a*, 312*b*, 312*c*, 312*d*). The housing (310) may four lateral surfaces, and the four of the driving part coupling parts (312*a*, 312*b*, 312*c*, 312*d*) may be disposed on the four lateral surfaces, respectively.

Meanwhile, the driving part coupling part (312) and the sensor mounting part (740) may be disposed together on one lateral surface of the housing (310). Here, a size of the driving part coupling part (312) disposed on one lateral surface of the housing (310) may be smaller than a size of the driving part coupling part (312) disposed on another surface adjacent to the one lateral surface. Meanwhile, the driving part coupling part (312) disposed on one lateral surface of the housing (310) may be disposed biased to an edge formed by encounter of the one lateral surface and another lateral surface.

The driving part coupling part (312) of the housing (310) may include a first driving part coupling part (312*a*), a second driving part coupling part (312*b*), a third driving part coupling part (312*c*), and a fourth driving part coupling part (312*d*).

A first driving magnet (321) may be coupled to the first driving part coupling part (312*a*), a second driving magnet (322) may be coupled to the second driving part coupling part (312*b*), a third driving magnet (323) may be coupled to the third driving part coupling part (312*c*), and a fourth driving magnet (324) may be coupled to the fourth driving part coupling part (312*d*).

Meanwhile, the first driving part coupling part (312*a*) and the second driving part coupling part (312*b*) may be disposed facing each other, and the third driving part coupling part (312*c*) and the fourth driving part coupling part (312*d*) may be disposed facing each other.

In addition, the first driving part coupling part (312*a*) and the second driving part coupling part (312*b*) may be disposed symmetrical to each other based on a center of the housing (310), and the third driving part coupling part (312*c*) and the fourth driving part coupling part (312*d*) may be disposed symmetrical to each other based on a center of the housing (310).

Furthermore, the first driving part coupling part (312*a*) and the second driving part coupling part (312*b*) may have a shape corresponding to each other, and the third driving part coupling part (312*c*) and the fourth driving part coupling part (312*d*) may have a shape corresponding to each other.

However, in some exemplary embodiments, as illustrated in FIG. 2, the first driving part coupling part (312*a*) and the third driving part coupling part (312*b*) may be provided in shapes different from each other, respectively.

In addition, the third driving part coupling part (312*c*) and the fourth driving part coupling part (312*d*) may be disposed biased to one side. Through this structure, the sensor part (730) sensing the first magnet (710) may secure a fixed position on the housing (310).

The upper support member (610) may be coupled to an upper portion of the housing (310), and the lower support member (620) may be coupled to a lower portion of the housing (310). The housing (310) may include an upper coupling part (313) coupled to the upper support member (610).

The upper coupling part (313) may be coupled to an outer coupling part (614) of the upper support member (610). According to an exemplary embodiment of the present disclosure, the upper coupling portion (1313) provided as a protrusion may be coupled by being inserted in the outer coupling part (614) provided as a groove. Meanwhile, a protrusion may be provided at the upper support member (610), and a groove may be provided at the housing (310), such that these two components can be coupled to each other.

Meanwhile, the housing (310) may include a lower coupling part (not illustrated) coupled to the lower support member (620). The lower coupling part formed at a lower portion of the housing (310) may be coupled to an outer coupling part (624) of the lower support member (620). According to an exemplary embodiment of the present disclosure, the lower coupling part provided as a protrusion may be coupled by being inserted in the outer coupling part (614) provided as a groove.

According to an exemplary embodiment of the present disclosure, the housing (310) may take a quadrilateral shape when viewed from the above. Here, a recessed part (314) may be disposed on an edge formed by encounter of adjacent corners of the quadrilateral housing (310).

That is, the housing (310) may include a recessed part (314) disposed on the edge. The recessed part (314) may be recessed to provide a space where an extended part (520) of the base (500) can be located. The recessed part (314) may be provided in a shape corresponding to that of the extended part (520) of the base (500).

In some exemplary embodiments, an adhesive (not illustrated) may be provided between the recessed part (314) and the extended part (520) such that these two components can be fixed to be coupled, when the lens driving device (10) is provided as an AF model such that the housing (310) is not required to dynamically move.

Alternatively, a damper (not illustrated) may be provided between the recessed part (314) and the extended part (520) such that the resonance generated from the lens driving device (10) can be alleviated, when the lens driving device (10) is provided as an OIS model such that fluidity of the housing (310) is required to be secured.

The housing (310) may include a stopper (315) protrusively formed toward an upper direction. The stopper (315) may absorb impacts by contacting a lower side of an upper surface of the cover member (100) when an external shock occurs. According to an exemplary embodiment of the present disclosure, as illustrated in FIG. 2, each of the stoppers (315) may be provided at each of four edges, but not limited hereto. Meanwhile, the stopper (315) may be integrally formed with the housing (310).

The second driving part (320) may be disposed facing to the first driving part (220) of the driver (200). The second driving part (320) may move the first driving part (220) through electromagnetic interaction with the first driving part (220). The second driving part (320) may include a magnet. The magnet may be fixed at the driving part coupling part (312) of the housing (310).

According to an exemplary embodiment of the present disclosure, as illustrated in FIG. 2, four independent magnets (321, 322, 323, 324) may be independently provided and arranged at the housing (310), where two adjacent magnets may form a 90 degree angle with each other. That is, the second driving part (320) may be arranged at four edges inside of the housing (310) at a same interval, aiming to efficient use of internal volume. In addition, the second driving part (320) may adhere to the housing (310) using such as an adhesive, but not limited hereto. Meanwhile, the first driving part (220) may include a magnet, and the second driving part (320) may be provided as a coil.

According to an exemplary embodiment of the present disclosure, the second driving part (320) may include four driving magnets (321, 322, 323, 324). That is, the second driving part (320) may include a first driving magnet (321), a second driving magnet (322), a third driving magnet (323), and a fourth driving magnet (324).

Here, the first driving magnet (321) may be coupled to the first driving part coupling part (312*a*), the second driving magnet (322) may be coupled to the second driving part coupling part (312*b*), the third driving magnet (323) may be coupled to the third driving part coupling part (312*c*), and the fourth driving magnet (324) may be coupled to the fourth driving part coupling part (312*d*).

Meanwhile, the first driving magnet (321) and the second driving magnet (322) may be disposed facing each other, and the third driving magnet (323) and the fourth driving magnet (324) may be disposed facing each other.

In addition, the first driving magnet (321) and the second driving magnet (322) may be disposed symmetrical to each other based on a center of the housing (310), and the third driving magnet (323) and the fourth driving magnet (324) may be disposed symmetrical to each other based on a center of the housing (310).

Furthermore, the first driving magnet (321) and the second driving magnet (322) may have a shape corresponding to each other, and the third driving magnet (323) and the fourth driving magnet (324) may have a shape corresponding to each other.

However, in some exemplary embodiments, as illustrated in FIG. 2, the first driving magnet (321) and the third driving magnet (323) may be provided in shapes different from each other, respectively.

In addition, the third driving magnet (323) and the fourth driving magnet (324) may be disposed biased to one side from one surface of the housing (310). Through this structure, the sensor part (730) sensing the first magnet (710) may secure a fixed position on the housing (310).

The base (500) may support the stator (300). A printed circuit board may be disposed at a lower side of the base (500). The base (500) may include a center hole (510) formed at a position corresponding to that of the lens coupling part (211) of the bobbin (210). The base (500) may function as a sensor holder protecting the image sensor. Meanwhile, the base (500) may be provided in order to dispose an infrared ray filter. The infrared ray filter may be coupled to the center hole (510) of the base (500).

According to an exemplary embodiment of the present disclosure, the base (500) may further include a foreign material collecting part (not illustrated) for collecting foreign materials introduced in the cover member (100). The foreign material collecting part may be disposed on an upper surface of the base (500) and may include an adhesive material, such that the foreign material collecting part can collect foreign materials in the inner space formed by the cover member (100) and the base (500).

The support member (600) may connect the driver (200) and the stator (300). The support member (600) may elastically connect the driver (200) and the stator (300) such that the driver (200) can relatively and dynamically move with respect to the stator (300). That is, the support member (600) may be provided as an elastic member. According to an exemplary embodiment of the present disclosure, as illustrated in FIG. 2, the support member (600) may include the upper elastic member (610) and the lower elastic member (620).

According to an exemplary embodiment of the present disclosure, the upper support member (610) may include an outer part (611), an inner part (612), and a connecting part (613). The upper elastic member (610) may include the outer part (611) coupled to the housing (310), the inner part (612) coupled to the bobbin (210), and the connecting part (613) elastically connecting the outer part (611) and the inner part (612).

The upper support member (610) may be connected to an upper portion of the driver (200) and to an upper portion of the stator (300). In particular, the upper support member (610) may be coupled to an upper portion of the bobbin (210) and to an upper portion of the housing (310). The upper support member (610) may include an outer coupling part (614) and an inner coupling part (615). The inner coupling part (615) of the upper support member (610) may be coupled to the upper coupling part (213) of the bobbin (210), and the outer coupling part (614) of the upper support member (610) may be coupled to the upper coupling part (313) of the housing (310).

According to an exemplary embodiment of the present disclosure, the lower support member (620) may include a pair of lower support members (620*a*, 620*b*). That is, the lower support member (620) may include a first lower support member (620*a*) and a second lower support member (620*b*). Each of the first lower support member (620*a*) and the second lower support member (620*b*) may be connected to each of a pair of lead wires of the first driving part (220) provided as a coil, so as to supply electric power. Meanwhile, a pair of the lower support member (620) may be electrically connected to the circuit board (750). Through this structure, the pair of the lower support member (620) may supply with electric power supplied from the circuit board (750) to the first driving part (220).

According to an exemplary embodiment of the present disclosure, the lower support member (620) may include an outer part (621), an inner part (622), and a connecting part (623). The lower elastic member (620) may include the outer part (621) coupled to the housing (310), the inner part (622) coupled to the bobbin (210), and the connecting part (623) elastically connecting the outer part (621) and the inner part (622).

The lower support member (620) may be connected to a lower portion of the driver (200) and to a lower portion of the stator (300). In particular, the lower support member (620) may be coupled to a lower portion of the bobbin (210) and to a lower portion of the housing (310). The lower support member (620) may include an outer coupling part (624) and an inner coupling part (625). The inner coupling part (625) of the lower support member (620) may be coupled to the lower coupling part (214) of the bobbin (210), and the outer coupling part (624) of the lower support member (620) may be coupled to the lower coupling part (314) of the housing (310).

The sensing unit (700) may be used for AF (Auto Focus) feedback and/or OIS (Optical Image stabilization) feedback. That is, the sensing unit (700) may sense a position or movement of at least one of the driver (200) and the stator (300).

According to an exemplary embodiment of the present disclosure, the sensing unit (700) may include a first magnet (710), a first mounting part (720), a sensor part (730), a sensor mounting part (740), and a circuit board (750). Here, the first magnet (710) may also be referred to as a sensing magnet, because the first magnet (710) is a magnet that is sensed by the sensor part (730).

The first magnet (710) may be disposed at the driver (200). In particular, the sensing magnet (710) may be disposed at the bobbin (210). Furthermore, the first magnet (710) may be disposed at a first mounting part (720) disposed on an outer circumferential surface of the bobbin (210). According to an exemplary embodiment of the present disclosure, the first magnet (710) may be mounted at the first mounting part (720) that is disposed by being recessed more than the driving part coupling part (212) formed by being recessed on an outer circumferential surface of the bobbin (210). In this case, the first magnet (710) may be disposed between the first driving part (220) and the bobbin (210). Here, the first driving part (220) and the first magnet (710) may be disposed to avoid overlapping in a horizontal direction, in order to minimize interaction between the first driving part (220) and the first magnet (710).

The first magnet (710) may be mounted at the first mounting part (720). The first mounting part (720) may be formed on an outer circumferential surface of the bobbin (210). The first mounting part (720) may be formed by being recessed more than the driving part coupling part (212) formed by being recessed on an outer circumferential surface of the bobbin (210). An adhesive may be coated between the first mounting part (720) and the first magnet (710), such that the first magnet (710) can be fixed to the first mounting part (720). The first mounting part (720) may take a shape where at least one side among top, bottom, and lateral sides is opened. In addition, the first mounting part (720) may be formed such that only one surface among six surfaces of the first magnet (710) can be opened.

The sensor part (730) may be disposed facing to the first magnet (710). The sensor part (730) may sense a position of the first magnet (710). According to an exemplary embodiment of the present disclosure, the sensor part (730) may include a Hall sensor sensing magnetic force of the first magnet (710). The sensor part (730) may be disposed at the sensor mounting part (740). That is, the sensor part (730) may be disposed on the housing (310). The sensor part (730) may be connected to the circuit board (750).

The sensor mounting part (740) may be disposed at the housing (310). The sensor mounting part (740) may be provided to penetrate through a lateral surface of the housing (310). Through this structure, one surface of the sensor part (730) disposed at the sensor mounting part (740) may face the first magnet (710) and another surface of the sensor part (730) may be coupled to the circuit board (750). The sensor mounting part (740) may be provided in a shape corresponding to that of the sensor part (730). According to an exemplary embodiment of the present disclosure, the sensor mounting part (740) may be disposed on a lateral surface of the housing (310) where the fourth driving part coupling part (312*d*) is located.

The circuit board (750) may be connected to the sensor part (730) so as to supply electric power to the sensor part (730) from external sources and to transmit/receive information. That is, the sensor part (730) may be mounted on the circuit board (750). According to an exemplary embodiment of the present disclosure, the circuit board (750) may be disposed between the housing (310) and the cover member (100). The circuit board (750) may include an FPCB (Flexible Printed Circuit Board). In addition, the circuit board (750) may include a terminal part (751) connected to external source and configure to transmit/receive at least one of electric power and information.

The second magnet part (800) may include a second magnet (810) and a second mounting part (820). Here, the second magnet (810) may be also referred to as a symmetrical magnet or a compensating magnet, because the second magnet (810) is symmetrically arranged to establish magnetic force equilibrium with the first magnet (810).

The second magnet (810) may be arranged to establish magnetic force equilibrium with the first magnet (710). In particular, the first magnet (710) and the second magnet (810) may be disposed such that the magnetic force applied to the first driving part (220) or the second driving part (320) can establish equilibrium.

Meanwhile, the first magnet (710) and the second magnet (810) may be disposed such that the magnetic force applied to the cover member (100) made of metallic material can establish equilibrium. In addition, the first magnet (710) and the second magnet (810) may be disposed such that the magnetic force applied to the support member (600) made of metallic material can establish equilibrium.

That is, the first magnet (710) may be disposed at one side of the driver (200), and the second magnet (810) may be disposed at another side of the driver (200). The first magnet (710) and the second magnet (810) may be symmetrically disposed to each other based on a center of the bobbin (210). That is, the first magnet (710) and the second magnet (810) may be symmetrically disposed to each other based on an optical axis of the lens module. In other words, the first magnet (710) and the second magnet (810) may be symmetrically disposed to each other based on an optical axis of the lens driving device (10).

The first magnet (710) and the second magnet (810) may be in shape and size corresponding to those of each other. The second magnet (810) may be disposed at the second mounting part (820). The second magnet (810) may be disposed at the second mounting part (820) disposed on an outer circumferential surface of the bobbin (210).

The second mounting part (820) may be disposed on an outer circumferential surface of the bobbin (210). The second mounting part (820) may be disposed symmetrically to the first mounting part (720) based on an optical axis of the lens module.

That is, in the case that the bobbin (210) has four lateral surfaces, the first mounting part (720) and the second mounting part (820) may be respectively disposed at the lateral surfaces facing each other. That is, the first mounting part (720) may be disposed at one surface of the bobbin (210), and the second mounting part (820) may be disposed at another surface of the bobbin (210).

The first mounting part (720) and the second mounting part (820) may be disposed to be overlapped in a horizontal direction. The second mounting part (820) may be formed by being recessed more than the driving part coupling part (212) formed by being recessed on an outer circumferential surface of the bobbin (210). The second mounting part (820) may be provided in a shape corresponding to that of the second magnet (810). An adhesive may be coated between the second mounting part (820) and the second magnet (810), such that the second magnet (810) can fixed to the second mounting part (820).

According to an exemplary embodiment of the present disclosure, the second magnet (810) may be provided as a plurality of second magnets (810). In this case, the plurality of second magnets (810) may be arranged such that the plurality of second magnets (810) can establish magnetic force equilibrium with the first magnet (710).

The first magnet (710) and the second magnet (810) may be disposed to establish magnetic force equilibrium with each other.

The bobbin (210) may include a first outer circumferential surface (201), a second outer circumferential surface (202), and a first edge part (203) formed by encounter of the first outer circumferential surface (201) and the second outer circumferential surface (202). In this case, the first magnet (710) may be disposed at the first outer circumferential surface (201). Meanwhile the first magnet (710) may be disposed biased to the first edge part (203). That is, the first magnet (710) may be disposed aside from a center of the first outer circumferential surface (201). In other words, a center of the first magnet (710) may not be identical to a center of the first outer circumferential surface (201).

The bobbin (210) may include a third outer circumferential surface (204) facing the first outer circumferential surface (201), a fourth outer circumferential surface (202) facing the second outer circumferential surface (202), and a second edge part (206) formed by encounter of the third outer circumferential surface (204) and the fourth outer circumferential surface (205). In this case, the second magnet (810) may be disposed at the third outer circumferential surface (204). Meanwhile the second magnet (810) may be disposed biased to the second edge part (206). That is, the second magnet (810) may be disposed aside from a center of the third outer circumferential surface (204). In other words, a center of the second magnet (810) may not be identical to a center of the third outer circumferential surface (204).

Meanwhile, the fourth driving magnet (324) illustrated in FIG. 5 may be also referred to as "third magnet", in order to be distinctive from "first magnet (710)" and "second magnet (810)".

Hereinafter, operations of a camera module according to an exemplary embodiment of the present disclosure will be described with reference to drawings.

Figure 6:
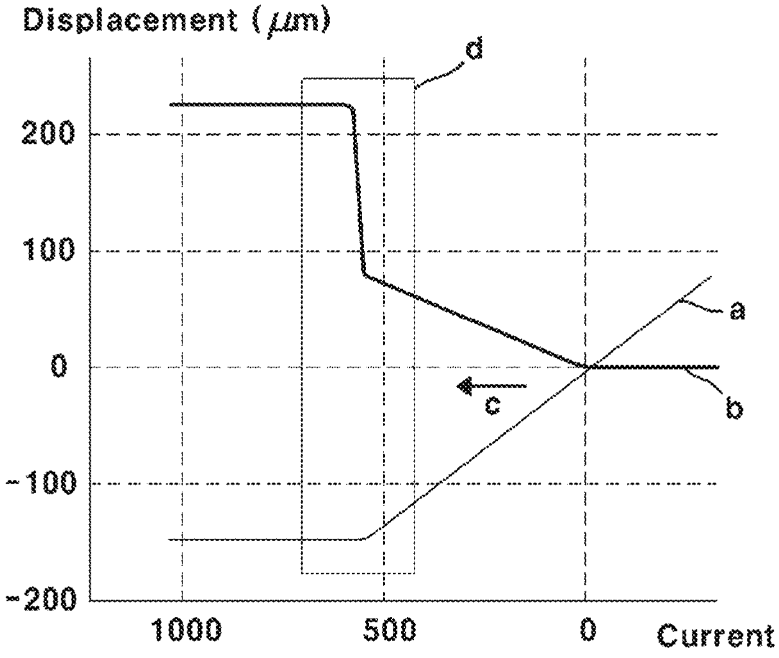
FIG. 6 is a graph illustrating an effect of a lens driving device according to an exemplary embodiment of the present disclosure.
Figure 6:
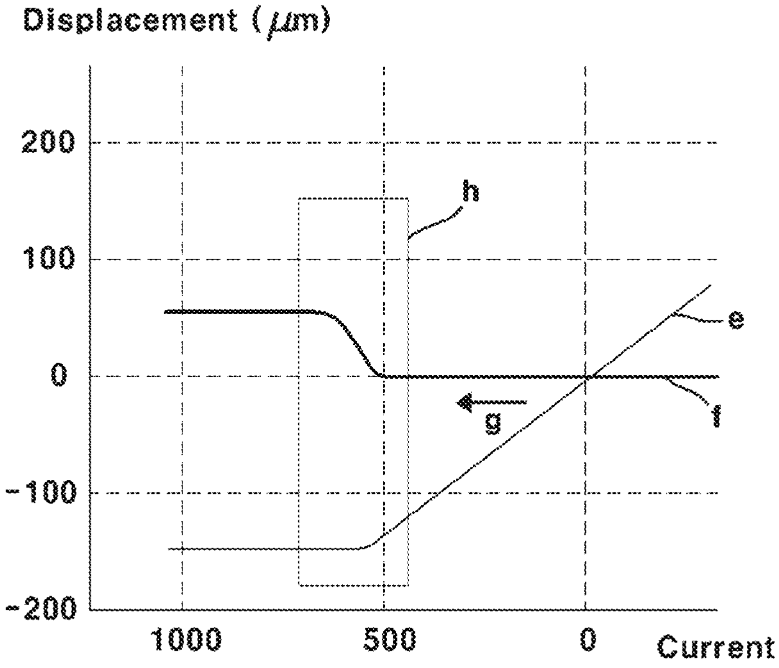

FIG. 6 is a graph illustrating an effect of a lens driving device according to an exemplary embodiment of the present disclosure.

At first, an electric power may be applied to the first driving part (220) provided as a coil. Here, a supply route of the electric power may be various. According to an exemplary embodiment of the present disclosure, the electric power supplied from an external source through the terminal part (751) of the circuit board (750) may be supplied to the coil through a pair of the lower support members (620). Here, the first driving part (220) and the bobbin (210) that moves integrally with the first driving part (220) may move upward or downward, depending on a directional nature of the current supplied to the coil. Through such operation as described in the above, the lens driving device (10) may perform AF (Auto Focus) function. Meanwhile, the tilt of the bobbin (210) may also be controlled by the electric power applied to the coil, such that an OIS (Optical Image Stabilization) can be performed.

A feedback control may be performed in order for more precise AF function. In particular, when the bobbin (210) is moved by the current applied to the coil, the sensor part (730) may sense movement of the first magnet (710) in real time, and may transmit the sensed information to the controller. Afterwards, the controller may perform feedback control, by determining, based on the information received from the sensor part (730), whether or not to additionally move the bobbin (210).

Meanwhile, in the process of feedback control as described in the above, the first magnet (710), which is a subject to be sensed by the sensor part (730), may exert magnetic influence on the first driving part (220), the second driving part (320), the support member (600), and the cover member (100).

This phenomenon may be ascertained in FIG. 6(*a*). FIG. 6(*a*) illustrates a result of experiment with respect to response characteristic of the camera module including only a first magnet (710) without a second magnet (810). In FIG. 6(*a*), a displacement amount of the bobbin (210) is illustrated as "a", and a tilt amount of the bobbin (210) is illustrated as "b", where the amount of current applied to the coil is defined as an x-axis, and the displacement is defined as a y-axis.

Referring to FIG. 6(*a*), it can be ascertained that the displacement amount of the bobbin (210) increases as the amount of current applied to the coil increases (c). Thereafter, when the amount of current reaches a predetermined value, the displacement amount of the bobbin (210) does not increase, even though the amount of current applied to the coil further increases. This is because the bobbin (210) has been stably accommodated on the base (500) while moving downward (d).

However, it is illustrated in FIG. 6(*a*) that the bobbin (210) has a tilt of around 210 μm while being stably accommodated on the base (500). That is, there is a tilt of around 210 μm when the bobbin (210) is stably accommodated on the base (500), in comparison with an initial status of the bobbin (210). It may be interpreted that a static tilt to an extent of around 210 μm is generated on the bobbin (210) in its initial status where no current is applied to the coil, when deeming that the status where the bobbin (210) is stably accommodated on the base (500) is a status where the tilt is 0 μm. That is, the first magnet (710) has generated a static tilt to the extent of around 210 μm in the initial status where no current is applied to the coil.

FIG. 6(*b*) illustrates a result of experiment with respect to response characteristic of the camera module including both the first magnet (710) and the second magnet (810) arranged to establish magnetic force equilibrium with the first magnet (710). In FIG. 6(*b*), a displacement amount of the bobbin (210) is illustrated as “e”, and a tilt amount of the bobbin (210) is illustrated as “f”, where the amount of current applied to the coil is defined as an x-axis, and the displacement is defined as a y-axis.

Referring to FIG. 6(*b*), it can be ascertained that the displacement amount of the bobbin (210) increases as the amount of current applied to the coil increases (g). Thereafter, when the amount of current reaches a predetermined value, the displacement amount of the bobbin (210) does not increase, even though the amount of current applied to the coil further increases. This is because the bobbin (210) has been stably accommodated on the base (500) while moving downward (h). So far, it is the same as FIG. 6(*a*).

However, it is illustrated in FIG. 6(*b*) that the bobbin (210) has a tilt of around 60 μm while being stably accommodated on the base (500). That is, it may be interpreted that a static tilt to an extent of around 60 μm is generated on the bobbin (210) in the initial status where no current is applied to the coil.

Therefore, when comparing FIG. 6(*a*) with FIG. 6(*b*), it can be ascertained that the static tilt of around 210 μm in FIG. 6(*a*) has been reduced to around 60 μm by the second magnet (810) at a difference of around 150 μm in FIG. 6(*b*). That is, the camera module according to an exemplary embodiment of the present disclosure can provide more precise auto focus function, by reducing the static tilt amount and the dynamic tilt amount of the bobbin as well, using the second magnet.

Hereinafter, a structure of the lens driving device (1010) will be described in detail with reference to the drawings.

Figure 7:
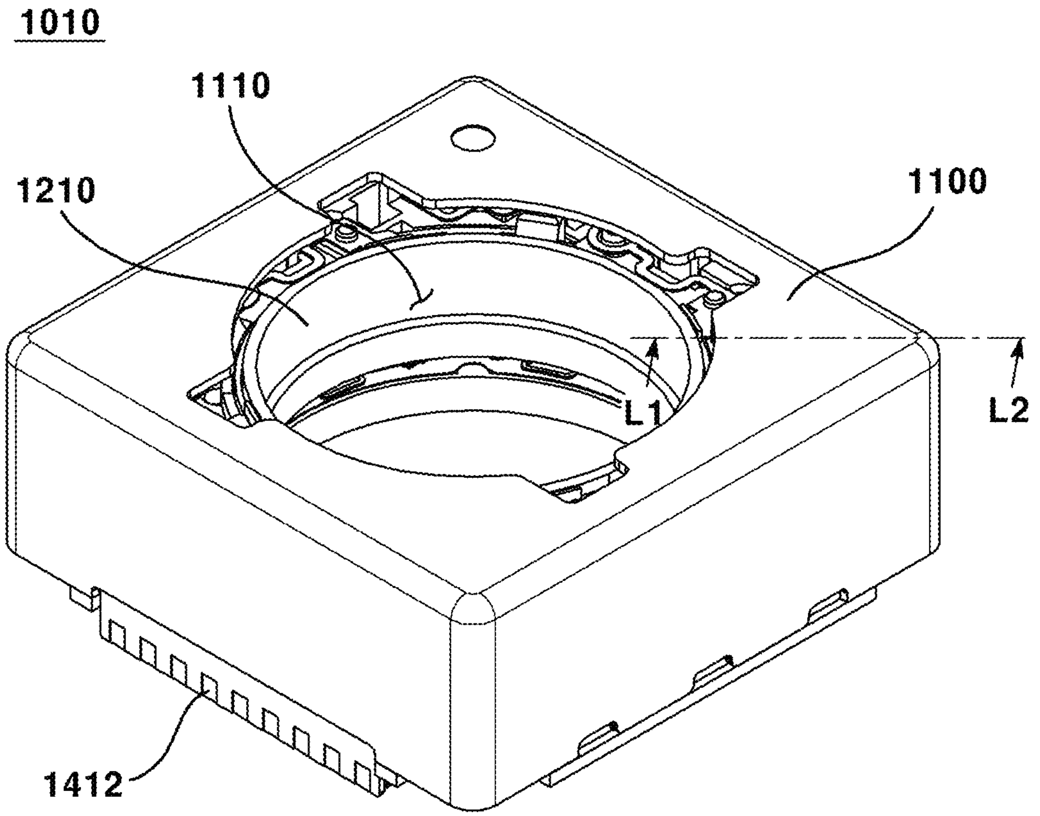
FIG. 7 is a perspective view illustrating a lens driving device according to an exemplary embodiment of the present disclosure.
Figure 8:
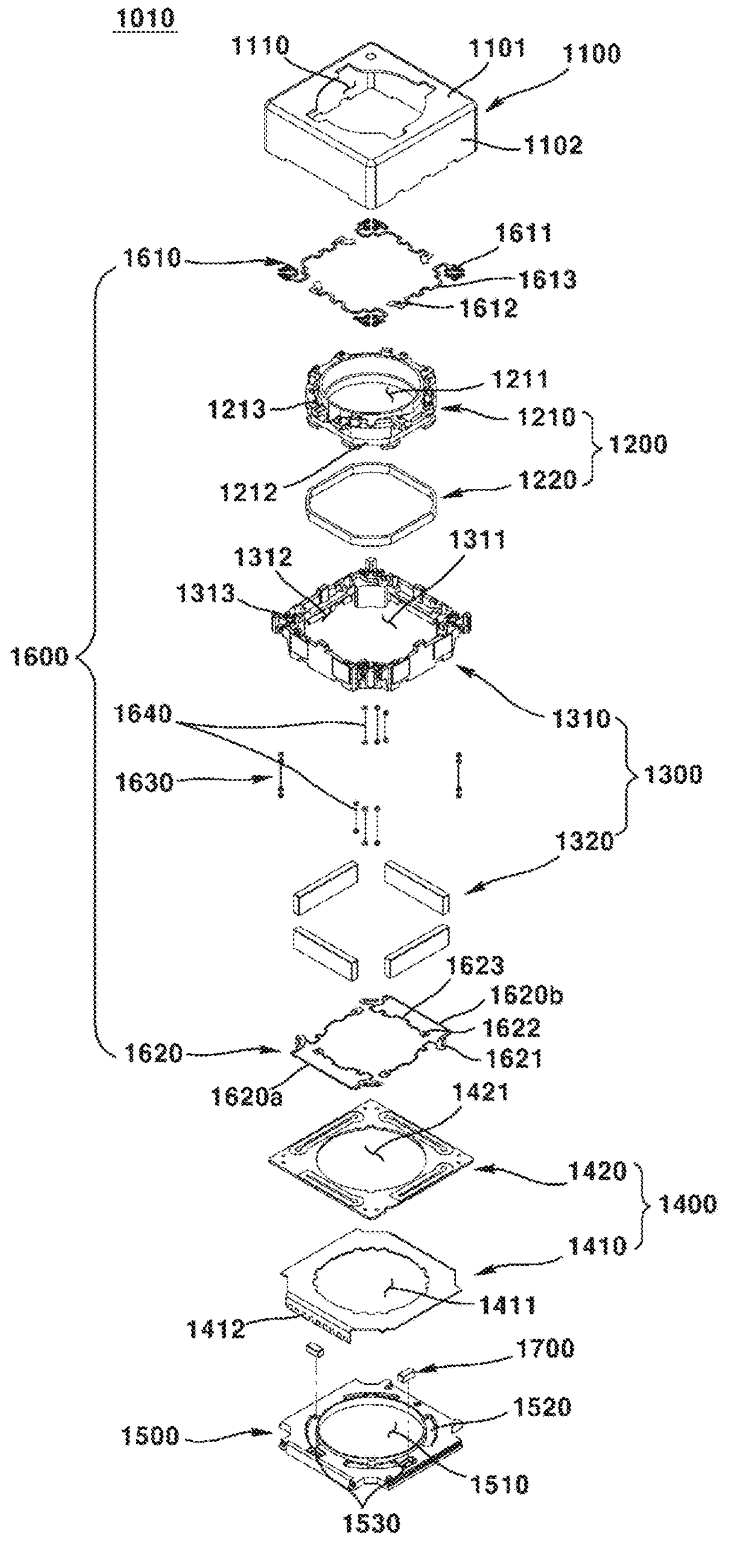
FIG. 8 is an exploded perspective view illustrating a lens driving device according to an exemplary embodiment of the present disclosure.
Figure 9:
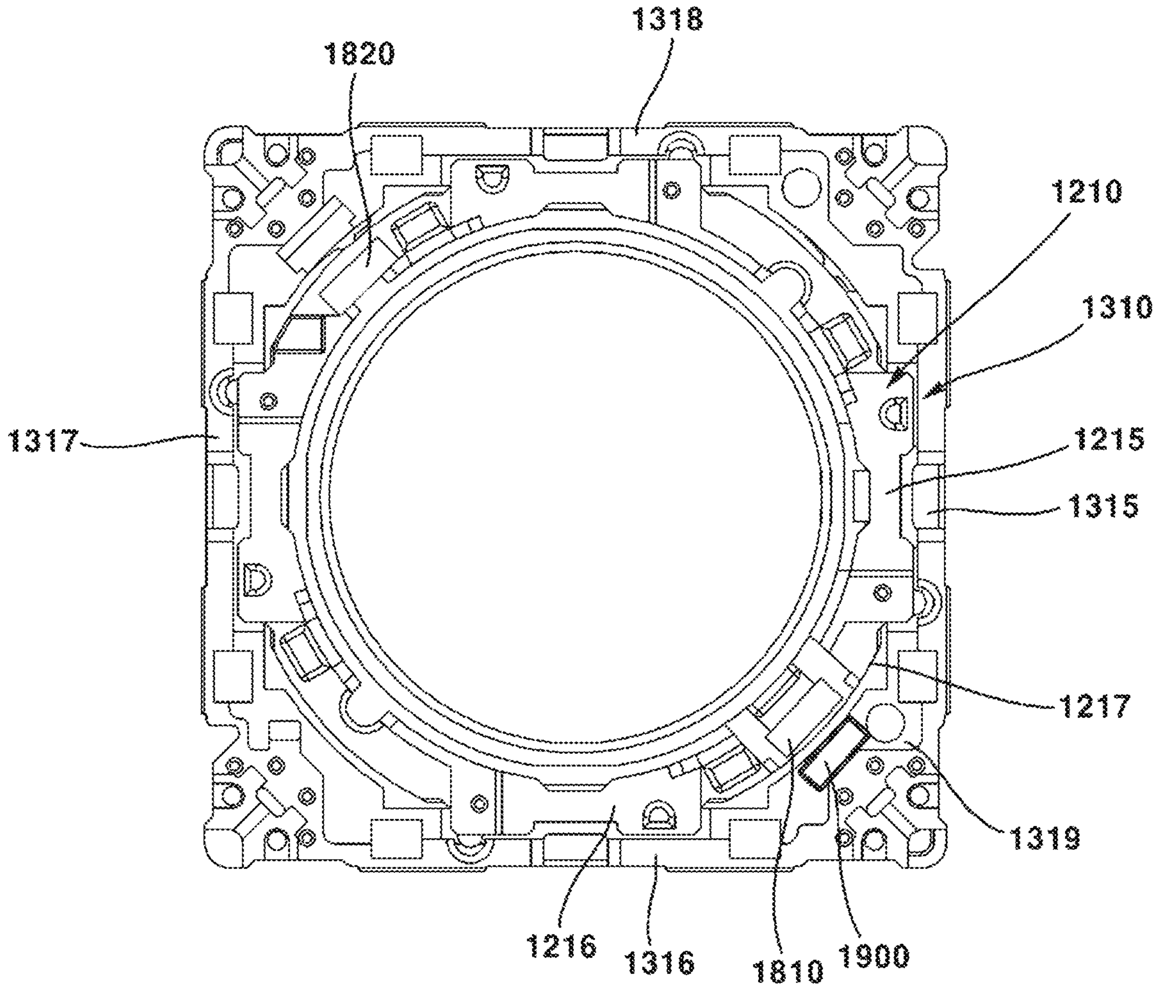
FIG. 9 is a plan view illustrating some parts of a lens driving device according to an exemplary embodiment of the present disclosure.
Figure 10:
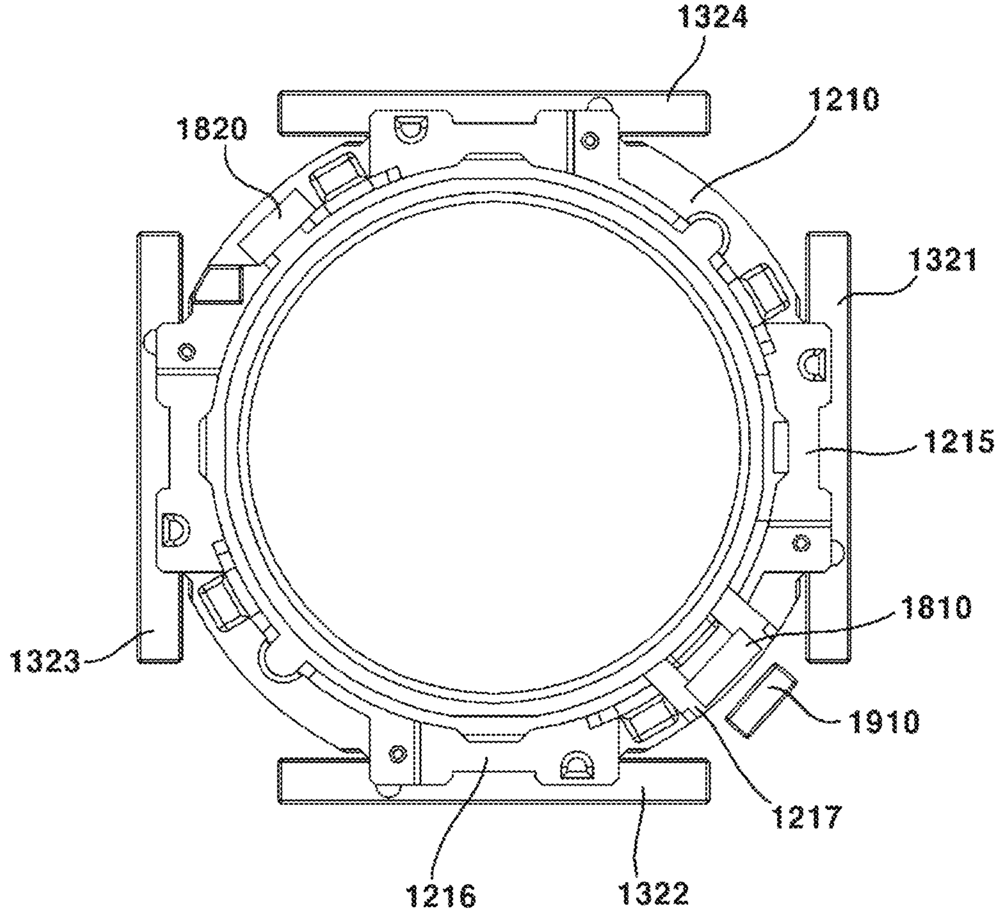
FIG. 10 is a plan view illustrating a lens driving device of FIG. 9 with a housing being omitted.
Figure 11:
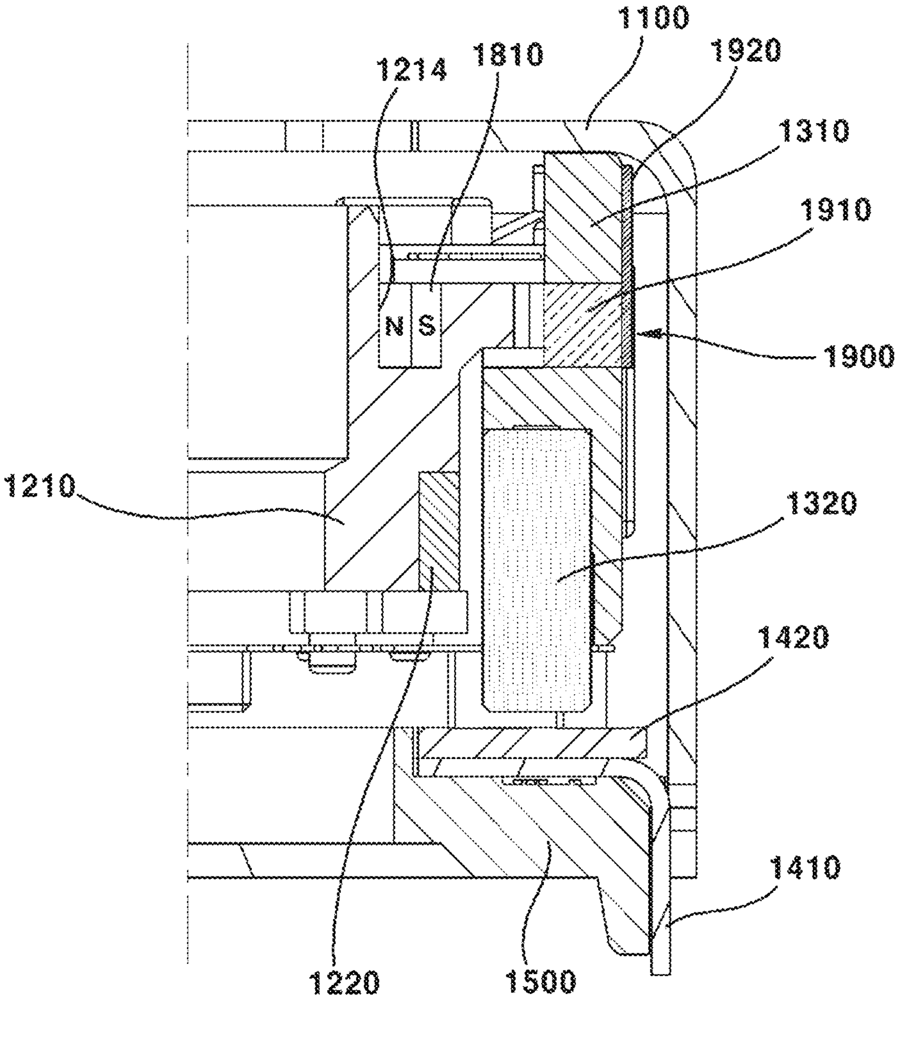
FIG. 11 is a sectional view in a direction of L1-L2 line of FIG. 7.
Figure 12:
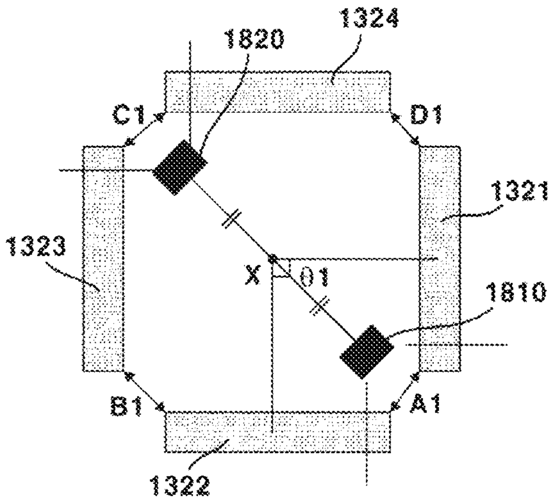
FIG. 12 is a conceptual view illustrating a lens driving device according to an exemplary embodiment and a modified exemplary embodiment of the present disclosure.
Figure 12:
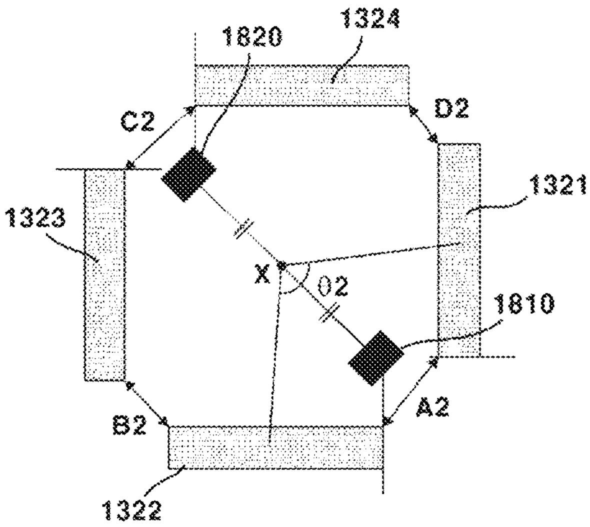
Figure 12:
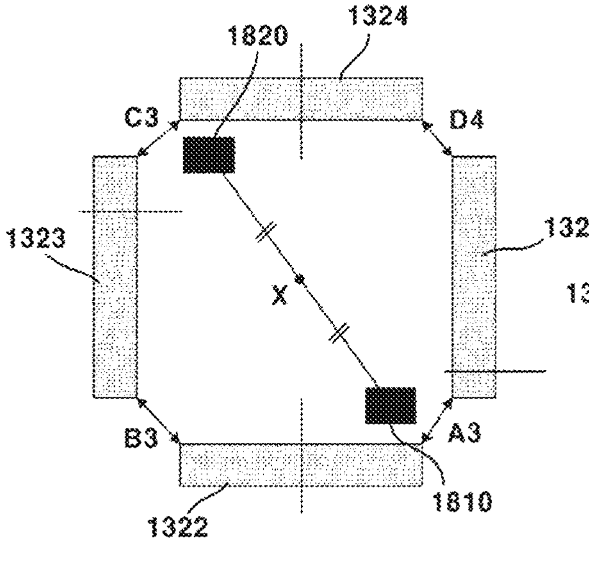
Figure 12:
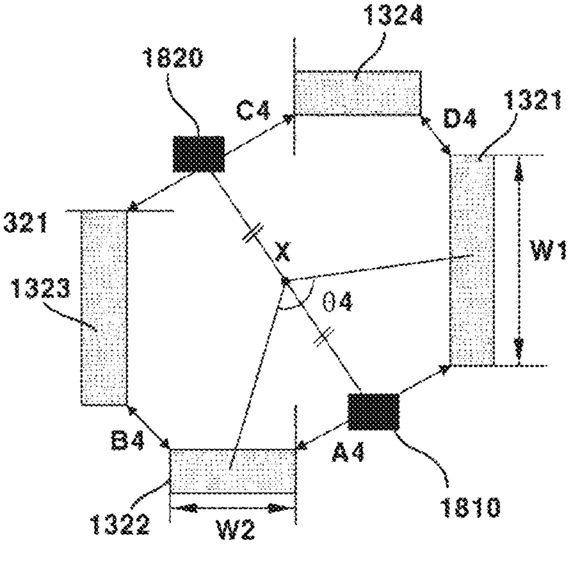

FIG. 7 is a perspective view illustrating a lens driving device according to an exemplary embodiment of the present disclosure; FIG. 8 is an exploded perspective view illustrating a lens driving device according to an exemplary embodiment of the present disclosure; FIG. 9 is a plan view illustrating some parts of a lens driving device according to an exemplary embodiment of the present disclosure; FIG. 10 is a plan view illustrating a lens driving device of FIG. 9 with a housing being omitted; FIG. 11 is a sectional view in a direction of L1-L2 line of FIG. 7; and FIG. 12 is a conceptual view illustrating a lens driving device according to an exemplary embodiment and a modified exemplary embodiment of the present disclosure.

Referring FIGS. 7 through 12, the lens driving device (1010) according to an exemplary embodiment of the present disclosure may include a cover member (1100), a first driver (1200), a second driver (1300), a stator (1400), a base (1500), a support member (1600), and a first sensor part (1700). Alternatively, at least one of the cover member (1100), the first driver (1200), the second driver (1300), the stator (1400), the base (1500), the support member (1600), and the first sensor part (1700) may be omitted in the lens driving device (1010) according to an exemplary embodiment of the present disclosure.

The cover member (1100) may form an external appearance of the lens driving device (1010). For example, the cover member (1100) may be formed in a shape of a hexahedron of which lower portion is opened, but not limited hereto. The cover member (1100) may include an upper surface (1101) and a lateral surface (1102) extended downward form an outer side of the upper surface (1101). Meanwhile, the cover member (1100) may be installed at an upper portion of the base (1500). The first driver (1200), the second driver (1300), the stator (1400), and the support member (1600) may be disposed at an internal space formed by the cover member (1100) and the base (1500). In addition, the cover member (1100) may be coupled to the base (1500) with an inner lateral surface of the cover member (1100) closely adhered to a part or a whole of a lateral surface of the base (1500). Through this structure, the cover member (1100) may protect internal components from external impacts and inhibit penetration of external pollutants as well.

The cover member (1100) may be formed of metallic material. In particular, the cover member (1100) may be provided as a metallic plate. In this case, the cover member (1100) may block electronic interference. That is, the cover member (1100) may block electromagnetic wave generated outside of the lens driving device (110) from being introduced in the cover member (1100). In addition, the cover member (1100) may block electromagnetic wave generated inside of the lens driving device (1010) from being released out of the cove member (100). However, the material forming the cover member (100) is not limited hereto.

The cover member (1100) may include an opening (1110) formed on an upper surface and exposing the lens module. The opening (1110) may be formed in a shape corresponding to that of the lens module. That is, the light incident through the opening (1110) may pass through the lens module. Meanwhile, the light that has passed through the lens module may be delivered to the image sensor.

The first driver (1200) may include a bobbin (1210) and a first driving part (1220). The first driver (1200) may be coupled to a lens module that is a component of a camera module (here, the lens module may also be described as a component of the lens driving device (1010)). That is, the lens module may be disposed at an inner side of the first driver (1200). In other words, an inner circumferential surface of the first driver (1200) may be couple to an outer circumferential surface of the lens module. Meanwhile, the first driver (1200) may dynamically move integrally with the lens module through an interaction with the second driver (1300). That is, the first driver (1200) may move the lens module.

The first driver (1200) may include a bobbin (1210). In addition, the first driver (1200) may include a first driving part (1220) coupled to the bobbin (1210).

The bobbin (1210) may be coupled to the lens module. In particular, an outer circumferential surface of the lens module may be coupled to an inner circumferential surface of the bobbin (1210). Meanwhile, the first driving part (1220) may be coupled to the bobbin (1210). In addition, a lower portion of the bobbin (1210) may be coupled to a lower support member (1620), and an upper portion of the bobbin (1210) may be coupled to an upper support member (1610). The bobbin (1210) may be disposed at an inner side of the housing (1310). The bobbin (1210) may dynamically move relative to the housing (1310) in an optical axis direction.

The bobbin (1210) may include a lens coupling part (1211) formed at an inner side of the bobbin (1210). The lens module may be coupled to the lens coupling part (1211). A screw thread may be formed on an inner circumferential surface of the lens coupling part (1211), in a shape corresponding to that of a screw thread formed on an outer circumferential surface of the lens module. That is, the outer circumferential surface of the lens module may be coupled to the inner circumferential surface of the lens coupling part (1211).

The bobbin (1210) may include a first driving part coupling part (1212) guiding the first driving part (1220) to be wound or installed. The first driving part coupling part (1212) may be integrally formed with an outer lateral surface of the bobbin (1210). In addition, the first driving part coupling part (1212) may be formed consecutively along an outer circumferential surface of the bobbin (1210). Alternatively, the first driving part coupling part (1212) may be formed by being spaced at a predetermined interval along an outer circumferential surface of the bobbin (1210).

The first driving part coupling part (1212) may include a recessed part formed by a part of an outer lateral surface of the bobbin (1210) being recessed. Meanwhile, the first driving part (1220) disposed at the first driving part coupling part (1212). The first driving part (1220) disposed at the first driving part coupling part (1212) may be supported by a support part forming a part of the first driving part coupling part (1212).

The bobbin (1210) may include an upper coupling part (1213) coupled to an upper support member (1610). The upper coupling part (1213) may be coupled to an inner part (1612) of the upper support member (1610). As an example, the upper coupling part (1213) provided as a protrusion may be coupled by being inserted in the inner part (1612) provided as a groove. Meanwhile, a protrusion may be provided at the upper support member (1610) and a groove may be formed at the bobbin (1210), and these two components may be couple to each other.

Meanwhile, the bobbin (1210) may include a lower coupling part (not illustrated) coupled to a lower support member (1620). The lower coupling part formed at a lower portion of the bobbin (1210) may be coupled to an inner part (1622) of the lower support member (1620).

As an example, the lower coupling part provided as a protrusion may be coupled by being inserted in the inner part (1622) provided as a groove.

The first driving part (1220) may be disposed facing the second driving part (1320) of the second driver (1300). The first driving part (1220) may move the bobbin (1210) with respect to the housing (1310), through electromagnetic interaction with the second driving part (1320). The first driving part (1220) may include a coil. The coil may be wound on an outer surface of the bobbin (1210), by being guided by the first driving part coupling part (1212).

In addition, the coil may include four independent coils, of which two adjacent coils may form a 90 degree angle to be arranged at an outer surface of the bobbin (1210). In a case where the first driving part (1220) includes a coil, the electric power supplied to the coil may be supplied through the lower support member (1620). Here, the lower support member (1620) may be separately provided in a pair. Meanwhile, the first driving part (1220) may include a pair of lead cables (not illustrated) for electric power supply. In this case, each of the pair of lead cables of the first driving part (1220) may be respectively coupled to the pair of the lower support members (1620). Meanwhile, an electromagnetic field may be formed around the coil, when the electric power is supplied to the coil. In addition, the first driving part (1220) may include a magnet. In such case, the second driving part (1320) may be provided as a coil.

The second driver (1300) may be disposed at an outer side of the first driver (1200) by facing the first driver (1200). The second driver (1300) may be supported by the base (1500) disposed at a lower side. The second driver (1300) may be disposed at an internal space of the cover member (1100).

The second driver (1300) may include a housing (1310) disposed at an outer side of the bobbin (1210). In addition, the second driver (1300) may include a second driving part (1320) that is disposed facing the first driving part (1220) and fixed to the housing (1310).

The housing (1310) may be formed in shape corresponding to an inner lateral surface of the cover member (1100) forming an external appearance of the lens driving device (1010). In addition, the housing (1310) may be formed of an insulated material, and may be implemented as an injection molding material, in consideration of productivity. The housing (1310) may be arranged to be spaced apart at a predetermined distance from the cover member (1100), as a movable component for OIS (Optical Image Stabilization) operation.

Alternatively, in the AF (Auto Focus) model, the housing (1310) may be fixed on the base (1500). In addition, in the AF model, the housing (1310) may be omitted, and a magnet operating as the second driving part (1320) may be fixed to the cover member (1100).

In addition, upper and lower sides of the housing (1310) may be opened to accommodate the driver (1200) movable in up/downward directions. The housing (1310) may internally include an inner space (1311), where upper and lower sides of the inner space (1311) are opened. The first driver (1200) may be movably disposed at the inner space (1311). That is, the inner space (1311) may be provided in a shape corresponding to a shape of the first driver (1200). In addition, an outer circumferential surface of the inner space (1311) may be disposed spacing apart from an outer circumferential surface of the first driver (1200).

The housing (1310) may include a second driving part coupling part (1312) at a lateral surface of the housing (1310), where the second driving part coupling part (1312) may be formed in a shape corresponding to a shape of the second driving part (1320) to accommodate the second driving part (1320). That is, the second driving part coupling part (1312) may accommodate the second driving part (1320) and fix the second driving part (1320). The second driving part (1320) may be fixed to the second driving part coupling part (1312) using an adhesive (not illustrated). Meanwhile, the second driving part coupling part (1312) may be disposed on an inner circumferential surface of the housing (1310).

In this case, there is an advantage in that an electromagnetic interaction with the first driving part (1220) disposed at an inner side of the second driving part (1320) can be facilitated. According to an exemplary embodiment of the present disclosure, a lower portion of the second driving part coupling part (1312) may be opened. In this case, there is an advantage in that an electromagnetic interaction between the second driving part (1320) and the third driving part (1340) disposed at a lower side of the second driving part (1320) can be facilitated. According to an exemplary embodiment of the present disclosure, the second driving part coupling part (1312) may be provided in four pieces. The second driving part (1320) may be respectively couple to the four of the second driving part coupling parts (1312).

The upper support member (1610) may be coupled to an upper portion of the housing (1310), and the lower support member (1900) may be coupled to a lower portion of the housing (1310). The housing (1310) may include an upper coupling part (1313) coupled to the upper support member (1610).

The upper coupling part (1313) may be coupled to an outer part (1611) of the upper support member (1610). According to an exemplary embodiment of the present disclosure, the upper coupling part (1313) provided as a protrusion may be coupled by being inserted in a groove or a hole of the outer part (1611). Alternatively, a protrusion may be provided on the upper support member (1610), and a groove may be provided on the housing (1310), such that these two components can be coupled to each other.

Meanwhile, the housing (1310) may include a lower coupling part (not illustrated) coupled to the lower support member (1620). The lower coupling part formed at a lower portion of the housing (1310) may be coupled to an outer part (1621) of the lower support member (1620). According to an exemplary embodiment of the present disclosure, the lower coupling part provided as a protrusion may be coupled by being inserted in a groove or a hole of the outer part (1621).

The second driving part (1320) may be disposed facing to the first driving part (1220) of the first driver (1200). The second driving part (1320) may move the first driving part (1220) through electromagnetic interaction with the first driving part (1220). The second driving part (1320) may include a magnet. The magnet may be fixed at the second driving part coupling part (1312) of the housing (1310).

According to an exemplary embodiment of the present disclosure, as illustrated in FIG. 8, four independent magnets may be independently provided and arranged at the housing (1310), where two adjacent magnets may form a 90 degree angle with each other. That is, the second driving part (1320) may be arranged at four edges inside of the housing (1310) at a same interval, aiming to efficient use of internal volume. In addition, the second driving part (1320) may adhere to the housing (1310) using such as an adhesive, but not limited hereto. Meanwhile, the first driving part (1220) may include a magnet, and the second driving part (1320) may be provided as a coil.

The stator (1400) may be disposed facing to a lower side of the second driver (1300). Meanwhile, the stator (1400) may move the second driver (1300). In addition, penetrating holes (1411, 1421) corresponding to the lens module may be disposed at a center of the stator (1400).

The stator (1400) may include a circuit board (1410) disposed between the third driving part (1420) and the base (1500). In addition, the stator (1400) may include a third driving part (1420) disposed facing to a lower side of the second driving part (1320).

The circuit board (1410) may include an FPCB (Flexible Printed Circuit Board). The circuit board (1410) may be disposed between the third driving part (1420) and the base (1500). Meanwhile, the circuit board (1410) may supply electric power to the third driving part (1420).

In addition, the circuit board (1410) may supply electric power to the first driving part (1220) through a lateral support member (1630), an upper support member (1610), a conducting member (1640), and a lower support member (1620). The circuit board (1410) may include a penetrating hole (1411), where the light that has passed through the lens module may pass through the penetrating hole (1411). In addition, the circuit board (1410) may include a terminal part (1412) that is bent to be exposed to the outside. The terminal part (1412) may be connected to an external electric power source, such that the circuit board (1410) can be supplied with electric power.

The third driving part (1420) may include a coil. The housing (1310) fixed with the second driving part (1320) may be integrally moved by interaction with the second driving part (1320), when electric power is applied to a coil of the third driving part (1420). The third driving part (1420) may be electrically connected or installed on the circuit board (1410).

Meanwhile, the third driving part (1420) may include a penetrating hole (1421) for penetrating the light of the lens module. In addition, the third driving part (1420) may be formed as an FP (Fine Pattern) coil to be arranged or installed on the circuit board (1410), in consideration of miniaturization (lowering the height in z-axis direction that is an optical axis direction) of the lens driving device (1010).

The base (1500) may support the second driver (1300). A PCB (Printed Circuit Board) may be disposed at a lower side of the base (1500). The base (1500) may include a penetrating hole (1510) formed at a position corresponding to that of the lens coupling portion of the bobbin (1210). The base (1500) may function as a sensor holder protecting the image sensor. Meanwhile, an infrared ray filter may be disposed at the base (1500). The infrared ray filter may be coupled to the penetrating hole (1510) of the base (1500).

According to an exemplary embodiment of the present disclosure, the base (1500) may include a foreign material collecting part (1520) for collecting foreign materials introduced in the cover member (1100). The foreign material collecting part (1520) may be disposed on an upper surface of the base (1500) and may include an adhesive material, such that foreign material collecting part (1520) can collect foreign materials in the inner space, where the foreign materials may be generated by the cover member (1100) and the base (1500).

The base (1500) may further include a sensor installation part (1530) to which the first sensor part (1700) is coupled. That is, the first sensor part (1700) may be installed at the sensor installation part (1530). Here, the first sensor part (1700) may sense movement of the housing (1310) in horizontal directions by detecting the second driving part (1320) coupled to the housing (1310). According to an exemplary embodiment of the present disclosure, two of the sensor installation part (1530) may be provided. The first sensor part (1700) may be disposed at each of the two sensor installation parts (1530). In this case, the first sensor part (1700) may be so arranged as to sense movement of the housing (1310) in both of x-axis and y-axis directions.

The support member (1600) may connect at least any two of the first driver (1200), the second driver (1300), and the base (1500). The support member (1600) may elastically connect at least any two of the first driver (1200), the second driver (1300), and the base (1500), such that a relative movement between each component may be available. That is, the support member (1600) may be provided as an elastic member.

According to an exemplary embodiment of the present disclosure, as illustrated in FIG. 8, the support member (1600) may include an upper support member (1610), a lower support member (1620), a lateral support member (1630), and a conducting member (1640). Here, the conducing member (1640) may be provided only for electrical conduction between the upper support member (1610) and the lower support member (1620). Thus, the conducting member (1640) may be described in distinction from the upper support member (1610), the lower support member (1620), the lateral support member (1630), and the conducting member (1640).

According to an exemplary embodiment of the present disclosure, the upper support member (1610) may include an outer part (1611), an inner part (1612), and a connecting part (1613). The upper support member (1610) may include an outer part (1611) coupled to the housing (1310), an inner part (1612) coupled to the bobbin (1210), and a connecting part (1613) elastically connecting the inner part (1612) and the outer part (1611).

The upper support member (1610) may be connected to an upper portion of the first driver (1200) and to an upper portion of the second driver (1300). In particular, the upper support member (1610) may be coupled to an upper portion of the bobbin (1210) and to an upper portion of the housing (1310). The inner part (1612) of the upper support portion (1610) may be coupled to an upper coupling part (1213) of the bobbin (1210), and the outer part (1614) of the upper support member (1610) may be coupled to an upper coupling part (1313) of the housing (1310).

According to an exemplary embodiment of the present disclosure, the upper support member (1610) may be divided in six pieces. Two of the totally six divided pieces of the upper support member (1610) may be used to apply electric power to the first driving part (1220). Each of the two upper support members (1610) may be respectively connected to a pair of lower support members (1620*a*, 1620*b*) through the conducting member (1640). Meanwhile, the rest four pieces among the six upper support members (1610) may be used to apply electric power to the second sensor part (1900) and to input/output information between the controller and the second sensor part (1900). In addition, as a modified exemplary embodiment, two pieces of the six upper support members (1610) may be directly connected to the first driving part (1220), and the rest four pieces may be connected to the second sensor part (1900).

According to an exemplary embodiment of the present disclosure, the lower support member (1620) may include a pair of lower support members (1620*a*, 1620*b*). That is, the lower support member (1620) may include a first lower support member (1620*a*) and a second lower support member (1620*b*). Each of the first lower support member (1620*a*) and the second lower support member (1620*b*) may be connected to each of a pair of lead wires of the first driving part (1220) so as to supply electric power. Meanwhile, a pair of the lower support member (1620) may be electrically connected to the circuit board. Through this structure, the pair of the lower support member (1620) may supply electric power supplied from the circuit board to the first driving part (1220).

According to an exemplary embodiment of the present disclosure, the lower support member (1620) may include an outer part (1621), an inner part (1622), and a connecting part (1623). The lower support member (1620) may include an outer part (1621) coupled to the housing (1310), an inner part (1622) coupled to the bobbin (1210), and a connecting part (1623) elastically connecting the outer part (1621) and the inner part (1622).

The lower support member (1620) may be connected to a lower portion of the first driver (1200) and to a lower portion of the second driver (1300). In particular, the lower support member (1620) may be coupled to a lower portion of the bobbin (1210) and to a lower portion of the housing (1310). The inner part (1622) of the lower support member (1620) may be coupled with a lower coupling part of the bobbin (1210), and the outer part (1621) of the lower support member (1620) may be coupled with a lower coupling part of the housing (1310).

An end of the lateral support member (1630) may be fixed to the stator (1400) or to the base (1500), and another end of the lateral support member (1630) may be coupled to the upper support member (1610) or to the second driver (1300). According to an exemplary embodiment of the present disclosure, an end of the lateral support member (1630) may be couple to the base (1500), and another end of the lateral support member (1630) may be coupled to the second driver (1300). Alternatively, an end of the lateral support member (1630) may be couple to the stator (1400), and another end of the lateral support member (1630) may be coupled to the upper support member (1610). In this wise, the lateral support member (1630) may elastically support the second driver (1300), such that the second driver (1300) can be tilted or moved in horizontal directions.

According to an exemplary embodiment of the present disclosure, the lateral support member (1630) may be provided in the same number as the number in which the upper support member (1610) is provided. That is, six of the lateral support members (1630) may be provided and respectively connected to six of the upper support member (1610). In this case, the lateral support member (1630) may supply electric power supplied from the stator (1400) or from any external source to each of the upper support members (1610). According to an exemplary embodiment of the present disclosure, the number of the lateral support member (1630) may be determined in consideration of symmetry. According to an exemplary embodiment of the present disclosure, as illustrated in FIG. 8, totally eight of the lateral support member (1630) may be provided, two pieces at each of edges of the housing (1310).

According to an exemplary embodiment of the present disclosure, the lateral support member (1630) may be coupled to the upper support member (1610) and may include a structure for absorbing impacts. The structure for absorbing impacts may be provided at at least one of the lateral support member (1630) and the upper support member (1610). The structure for absorbing impacts may be a separate member such as a damper. Alternatively, the structure for absorbing impacts may be implemented through shape modification in some part of at least one of the lateral support member (1630) and the upper support member (1610).

The conducting member (1640) may electrically connect the upper support member (1610) and the lower support member (1620). The conducting member (1640) may be provided in separation from the lateral support member (1630). The electric power supplied to the upper support member (1610) may be supplied to the lower support member (1900) through the conducting member (1640). The electric power may be supplied to the first driving part (1220) through the lower support member (1620). Meanwhile, in a modified exemplary embodiment, the conducting member (1640) may be omitted, when the upper support member (1610) is directly connected to the first driving part (1220).

The first sensor part (1700) may be used for at least one of AF (Auto Focus) feedback and OIS (Optical Image Stabilization) feedback. That is, the first sensor part (1700) may detect a position or movement of at least one of the first driver (1200) and the second driver (1300). According to an exemplary embodiment of the present disclosure, the first sensor part (1700) may provide information for OIS feedback, by sensing a horizontal movement or tilt of the second driver (1300).

The first sensor part (1700) may be disposed at the stator (1400). The first sensor part (1700) may be disposed on an upper surface or a lower surface of the circuit board (1410) of the stator (1400). According to an exemplary embodiment of the present disclosure, the first sensor part (1700) may be disposed at a sensor installation part (1530) formed on the base (1500), by being arranged on the lower surface of the circuit board (1410). According to an exemplary embodiment of the present disclosure, the first sensor part (1700) may include a Hall sensor. In this case, the first sensor part (1700) may sense a relative movement of the second driver (1300) with respect to the stator (1400), by sensing electromagnetic field of the second driving part (1320) of the second driver (1300). According to an exemplary embodiment of the present disclosure, at least two of the first sensor parts (1700) may be provided, such that movement of the second driver (1300) in both x-axis and y-axis directions can be sensed.

According to an exemplary embodiment of the present disclosure, the lens driving device (1010) may comprise: a first driver (1200) including a first driving part (1220) and a bobbin (1210) disposed with the first driving part (1220); a second driver (1300) including a second driving part (1320) configured to move the first driving part (1220) through electromagnetic interaction with the first driving part (1220), and a housing (1310) disposed with the second driving part (1320); a stator (1400) including a third driving part (1420) configured to move the second driving part through electromagnetic interaction with the second driving part; a first magnet (1810) disposed at one side of the bobbin (1210); a second sensor part (1900) disposed at the housing, and sensing a position of the first magnet; and a second magnet (1820) disposed at another side of the bobbin (1210).

The bobbin (1210) may include a first outer circumferential surface (1215), a second outer circumferential surface (1216), and a third outer circumferential surfaces (1215), which are consecutively arranged. Meanwhile, the housing (1310) may include a first lateral surface (1315) facing the first outer circumferential surface (1215), a second lateral surface (1316) facing the second outer circumferential surface (1216), and a corner part (1319) facing the third outer circumferential surfaces (1215).

The housing (1310) may include a first lateral surface (1315), a second lateral surface (1316) adjacent to the first lateral surface (1315), and a corner part (1319) formed by encounter of the first lateral surface (1315) and the second lateral surface (1316).

Meanwhile, the bobbin (1210) may include a first outer circumferential surface (1215) facing the first lateral surface (1315), a second outer circumferential surface (1216) facing the second lateral surface (1316), and a third outer circumferential surface (1217) facing the corner part (1319). Here, the first magnet (1810) may be disposed at the third outer circumferential surface (1217) of the bobbin (1210).

In addition, the second driving part (1320) provided as a magnet may be disposed at the first lateral surface (1315) and the second lateral surface (1316) of the housing (1310). The housing (1310) may include a first lateral surface (1315), a second lateral surface (1316), a third lateral surface (1317), a fourth lateral surface (1318), which are consecutively adjacent to one another.

The second driving part (1320) may include a first driving magnet (1321), a second driving magnet (1322), a third driving magnet (1323), and a fourth driving magnet (1324). Here, the first driving magnet (1321) may be disposed at the first lateral surface (1315), the second driving magnet (1322) may be disposed at the second lateral surface (1316), the third driving magnet (1323) may be disposed at the third lateral surface (1317), and the fourth driving magnet (1324) may be disposed at the fourth lateral surface (1318).

Here, a separating space (C1) between the third driving magnet (1323) and the fourth driving magnet (1324) may correspond to a separating space (A1) between the first driving magnet (1321) and the second driving magnet (1322). Meanwhile, a separating space (D1) between the first driving magnet (1321) and the fourth driving magnet (1324) may correspond to a separating space (B1) between the second driving magnet (1321) and the third driving magnet (1323).

The second driving part (1320) may include first to fourth driving magnets (1321, 1322, 1323, 1324). The first driving magnet (1321) and the third driving magnet (1323) may be disposed opposite to each other, and the second driving magnet (1322) and the fourth driving magnet (1324) may be disposed opposite to each other. In addition, it may be also described that the first driving magnet (1321) may face the third driving magnet (1323) and the second driving magnet (1322) may face the fourth driving magnet (1324). The first driving magnet (1321) and the third driving magnet (1323) facing each other may be in a same shape. In the same manner, the second driving magnet (1322) and the fourth driving magnet (1324) facing each other may be in a same shape. Meanwhile, all of the first to fourth driving magnets (1321, 1322, 1323, 1324) may be provided in the same shape.

The first magnet (1810) may be disposed to avoid facing the second driving part (1320) provided as a magnet. That is, an orthographic projection of the first magnet (1810) toward the housing may not be overlapped with the second driving part (1320). In other words, the first magnet (1810) may be arranged so as to minimize magnetic force applied to the second driving part (1320). As illustrated in FIG. 12(*a*), the first magnet (1810) may be disposed at the third circumferential surface (1217) of the bobbin (1210). That is, the first magnet (1810) may be disposed on the bobbin (1210), so as to face the corner part (1319) of the housing (1310).

The first magnet (1810) may be spaced apart from the first driving part (1220) in a direction corresponding to an optical axis direction of a lens module coupled at an inner side of the bobbin (1210). Meanwhile, the first magnet (1810) may be spaced apart also from the second driving part (1220) in a direction corresponding to the optical axis direction of a lens module.

The first magnet (1810) may be disposed at an accommodating groove (1214) formed on the bobbin (1210). The accommodating groove (1214) may be of a bottom-opening type or a top-opening type. Here, the first magnet (1810) may have an N-pole and an S-pole disposed at an upper surface and a lower surface of the first magnet (1810), respectively. In this case, the first magnet (1810) may be coupled to the accommodating groove (1214), by a method of pushing one first magnet (1810) among a plurality of first magnets (1810) having N-poles and S-poles alternately arranged into an opening at an upper portion or a lower portion of the accommodating groove (1214). Thereby, the process to respectively couple the first magnet (1810) to each of the plurality of bobbins (1210) can be enhanced in convenience.

The accommodating groove (1214) may be of a top-and-bottom closing type formed by a part of the outer circumferential surface internally recessed. The first magnet (1810) may have an N-pole and an S-pole disposed at lateral surfaces of the first magnet (1810). In this case, the first magnet (1810) may be coupled to the accommodating groove (1214), by a method of pushing one first magnet (1810) among a plurality of first magnets (1810) having N-poles and S-poles alternately arranged in from a lateral side. Thereby, the process to respectively couple the first magnet (1810) to each of the plurality of bobbins (1210) can be enhanced in convenience.

The second magnet (1820) may also be referred to as symmetrical magnet or a compensating magnet, because the second magnet (1810) is symmetrically arranged to establish magnetic force equilibrium or weight equilibrium with the first magnet (1810). The second magnet (1820) may be provided for the magnetic force equilibrium or weight equilibrium with the first magnet (1810). The first magnet (1810) and the second magnet (1820) may be disposed such that the magnetic force applied to the first driving part (1220) or the second driving part (1320) can establish equilibrium. That is, the second magnet (1820) may be provided in order to inhibit the first magnet (1810) from affecting electromagnetic interaction between the first to third driving parts (1220, 1320, 1420). Alternatively, the second magnet (1820) may be provided for compensating the effect to secure performance of AF and/or OIS function, even if the first magnet (1810) affects electromagnetic interaction between the first to third driving parts (1220, 1320, 1420).

The first magnet (1810) and the second magnet (1820) may be disposed overlapped with the second driving part (1220) in a horizontal direction. Alternatively, the first magnet (1810) and the second magnet (1820) may be disposed to avoid being overlapped with the second driving part (1220) in a horizontal direction.

The first magnet (1810) may be disposed overlapped with the sensor (1910) in a horizontal direction. Alternatively, the first magnet (1810) may be disposed to avoid being overlapped with the sensor (1910) in a horizontal direction.

The first magnet (1810) and the second magnet (1820) may be disposed overlapped with the upper support member (1610) and/or the lower support member (1620) in a vertical direction. In particular, the first magnet (1810) and the second magnet (1820) may be disposed overlapped with a connecting part (1613) of the upper support member (1610) and/or a connecting part (1623) of the lower support member (1620) in a vertical direction The first magnet (1810) and the second magnet (1820) may be disposed, such that magnetic force applied to the cover member (1100) made of a metallic material can establish equilibrium. In addition, the first magnet (1810) and the second magnet (1820) may be disposed, such that magnetic force applied to the support member (1600) made of a metallic material can establish equilibrium. That is, the first magnet (1810) may be disposed at one side of the first driver (1200), and the second magnet (1820) may be disposed at another side of the first driver (1200).

The first magnet (1810) and the second magnet (1820) may be symmetrically disposed to each other, based on a center of the bobbin (1210). That is, the first magnet (1810) and the second magnet (1820) may be symmetrically disposed to each other, based on an optical axis of the lens module. In other words, the first magnet (1810) and the second magnet (1820) may be symmetrically disposed to each other, based on an optical axis of the lens driving device (1010).

The first magnet (1810) and the second magnet (1820) may be in shape and size corresponding to those of each other. The second magnet (1820) may be disposed at a second magnet accommodating groove (not illustrated) disposed on an outer circumferential surface of the bobbin (1210).

According to an exemplary embodiment of the present disclosure, the second magnet (1820) may be provided in plural number. In this case, the plurality of second magnets (1820) may be arranged such that influence of magnetic force provided by the plurality of second magnets (1820) and the first magnet (1810) can establish equilibrium.

The first magnet (1810) and the second magnet (1820) may be spaced apart at a distance corresponding to a center of the bobbin (1210). The center of the bobbin (1210) may be disposed on a virtual line connecting the first magnet (1810) and the second magnet (1820). That is, the first magnet (1810) and the second magnet (1820) may be disposed symmetrically based on a center of the bobbin (1210).

The first magnet (1810) and the second magnet (1820) may be in shape and size corresponding to those of each other. The first magnet (1810) and the second magnet (1820) may be disposed to establish magnetic force equilibrium or weight equilibrium with each other.

The second sensor part (1900) may sense a position of the first magnet (1810). The controller (not illustrated) may control the electric power applied to the first driving part (1220) by receiving a position of the first magnet (1810) sensed by the second sensor part (1900). That is, the position sensed by the second sensor part (1900) may be used for performing AF feedback function. The second sensor part (1900) may be disposed at a corner part (1319) of the housing (1310).

The second sensor part (1900) may include a sensor (1910) and a circuit board (1920) mounted with the sensor (1910). According to an exemplary embodiment of the present disclosure, the sensor (1910) may be a Hall sensor configured to sense magnetic force of a magnet. According to an exemplary embodiment of the present disclosure, the circuit board (1920) may be fixed to an outer side of the housing (1310), but not limited hereto. The circuit board (1920) may be directly connected to the circuit board (1410) of the stator (1400), or may be connected through the lateral support member (1630) and the upper support member (1610). The sensor (1910) may be supplied with electric power through the circuit board (1920), and may transmit/receive a sensing value and a control signal.

Meanwhile, the second sensor part (1900) may be disposed spaced from the second driving part (1320) in a direction corresponding to an optical axis direction of the lens module. That is, the second sensor part (1900) may be disposed to be overlapped with an orthographic projection of the first magnet (1810) toward the housing (1310).

Hereinafter, the lens driving device according to a modified exemplary embodiment of the present disclosure will be described with reference to FIG. 12.

Referring to FIG. 12(*a*), in the lens driving device according to an exemplary embodiment of the present disclosure, the first magnet (1810) may be disposed facing a separating space between the first driving magnet (1321) and the second driving magnet (1322). In particular, the first magnet (1810) may be disposed facing the corner part (1319) of the housing (1310). Here, an encountering angle between a virtual line connecting a center of the first driving magnet (1321) to a center (X) of the housing (1310) and a virtual line connecting a center of the second driving magnet (1322) to a center (X) of the housing (1310) may form a right (perpendicular) angle.

Referring to FIG. 12(*b*), in the lens driving device according to a modified exemplary embodiment of the present disclosure, it is the same that the first magnet (1810) may be disposed facing the corner part (1319) of the housing (1310), as in the previous exemplary embodiment. However, as illustrated in FIG. 12(*b*), a first separating distance (A2) between the first driving magnet (1321) and the second driving magnet (1322) may be longer than a second separating distance (B2) between the second driving magnet (1322) and the third driving magnet (1323). That is, the first separating distance (A2) of the first separating space facing the first magnet (1810) may be longer than the second separating distance (B2). In this case, influence of magnetic force that the first magnet (1810) applies to the second driving part (1320) can be minimized.

Meanwhile, according to a modified exemplary embodiment of the present disclosure, an encountering angle between a virtual line connecting a center of the first driving magnet (1321) to a center of the housing (1310) and a virtual line connecting a center of the second driving magnet (1322) to a center of the housing (1310) may form an acute angle or an obtuse angle. As an example, as illustrated in FIG. 12(*b*), the encountering angle (θ2) between a virtual line connecting a center of the first driving magnet (1321) to a center of the housing (1310) and a virtual line connecting a center of the second driving magnet (1322) to a center of the housing (1310) may form an obtuse angle.

Referring to FIG. 12(*c*), in the lens driving device according to another modified exemplary embodiment of the present disclosure, the first magnet (1810) may be disposed at a first outer circumferential surface (1215) of the bobbin (1210). Here, the first magnet (1810) may be disposed biased to the third outer circumferential surface (1217). In this case, the orthographic projection of the first magnet (1810) toward the housing (1310) may not be overlapped with the second driving part (1320). That is, the first magnet (1810) may be disposed spaced apart from the second driving part (1320) in upward/downward directions (in an optical axis direction of the lens module).

Referring to FIG. 12(*d*), in the lens driving device according to still another modified exemplary embodiment of the present disclosure, the first magnet (1810) may be disposed at a first outer circumferential surface (1215) of the bobbin (1210). Here, the first magnet (1810) may be disposed biased to the third outer circumferential surface (1217). In this case, the orthographic projection of the first magnet (1810) toward the housing (1310) may not be overlapped with the second driving part (1320). Meanwhile, the second driving part (1320) may include first to fourth driving magnets (1321, 1322, 1323, 1324).

The first driving magnet (1321) and the third driving magnet (1323) may be disposed opposite to each other, and the second driving magnet (1322) and the fourth driving magnet (1324) may be disposed opposite to each other. In addition, it may be also described that the first driving magnet (1321) may face the third driving magnet (1323) and the second driving magnet (1322) may face the fourth driving magnet (1324).

The first driving magnet (1321) and the third driving magnet (1323) facing each other may be in a same shape. In the same manner, the second driving magnet (1322) and the fourth driving magnet (1324) facing each other may be in a same shape.

However, the first driving magnet (1321) may be provided in a shape different form that of the second driving magnet (1322). According to an exemplary embodiment of the present disclosure, as illustrated in FIG. 12(*d*), the first driving magnet (1321) may be smaller than the second driving magnet (1322).

In particular, the first driving magnet (1321) may have a thickness and a height same as those of the second driving magnet (1322), and may have a width (W1, W2) different from that of the second driving magnet (1322). According to an exemplary embodiment of the present disclosure, as illustrated in FIG. 12(*d*), the width (W1) of the first driving magnet (1321) may be longer than the width (W2) of the second driving magnet (1322). That is, the second driving magnet (1322) may take a shape where some part of the width of the first driving magnet (1321) is omitted. Here, the first magnet (1810) may be disposed facing the omitted part of the second driving magnet (1322). That is, some part of the second magnet (1322) may be omitted in order to secure a space in which the first magnet (1810) is arranged. In this case, the magnetic force of the first magnet (1810) applied to the second driving part (1320) can be minimized.

Meanwhile, as illustrated in FIGS. 12(*a*) to 12(*d*), according to some exemplary embodiments and modified exemplary embodiments of the present disclosure, the separating distance (C1, C2, C3, C4) between the third driving magnet (1323) and the fourth driving magnet (1324) may correspond to a separating distance (A1, A2, A3, A4) between the first driving magnet (1321) and the second driving magnet (1322). Meanwhile, the separating distance (D1, D2, D3, D4) between the first driving magnet (1321) and the fourth driving magnet (1324) may correspond to a separating distance (B1, B2, B3, B4) between the second driving magnet (1322) and the third driving magnet (1323).

In the above, all elements composing an exemplary embodiment of the present disclosure have been described as being integrally combined or operating in combination, however, the present disclosure is not limited hereto. That is, within the scope of purpose of the present disclosure, at least one of all such elements may be selectively combined to operate. In addition, the terms such as "include", "comprise" or "have" are state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

What is claimed is:

1. A lens driving device, comprising:

a cover member comprising an upper plate and a lateral plate;

a bobbin disposed in the cover member;

a coil disposed on the bobbin;

a driving magnet disposed between the coil and the lateral plate of the cover member;

a first magnet disposed on the bobbin; and a sensor configured to sense the first magnet, wherein the lateral plate of the cover member comprises first and second lateral plates opposite to each other and third and fourth lateral plates opposite to each other, wherein the driving magnet comprises a first driving magnet disposed between the coil and the first lateral plate, a second driving magnet disposed between the coil and the third lateral plate, and a third driving magnet disposed between the coil and the second lateral plate, wherein each of the first driving magnet and the second driving magnet comprises an inner surface facing the coil, wherein a horizontal width of the inner surface of the first driving magnet is shorter than a horizontal width of the inner surface of the second driving magnet, and wherein the sensor is overlapped with the third driving magnet in a first direction perpendicular to the first lateral plate.

2. The lens driving device of claim 1, comprising a circuit board, wherein the sensor is disposed on the circuit board.

3. The lens driving device of claim 1, wherein the sensor is disposed between the bobbin and the first lateral plate of the cover member, wherein the cover member comprises an inner yoke bent from a part of an inner edge of the upper plate, wherein the bobbin comprises a groove concavely formed on an upper surface of the bobbin, and wherein at least a part of the inner yoke is inserted into the groove of the bobbin.

4. The lens driving device of claim 1, wherein the cover member comprises a first corner part disposed between the first lateral plate and the third lateral plate, a second corner part disposed between the second lateral plate and the third lateral plate, a third corner part disposed between the second lateral plate and the fourth lateral plate, and a fourth corner part disposed between the first lateral plate and the fourth lateral plate, wherein the second driving magnet is disposed at a position nearer to the first corner part than to the second corner part, and wherein the first driving magnet is disposed at a position nearer to the first corner part than to the fourth corner part.

5. The lens driving device of claim 4, wherein the sensor is disposed at a position nearer to the fourth corner part than to the first corner part.

6. The lens driving device of claim 1, wherein the horizontal width of the inner surface of the first driving magnet is a length of the first driving magnet in a second direction perpendicular to the third lateral plate of the cover member.

7. The lens driving device of claim 4, wherein the driving magnet comprises a fourth driving magnet disposed between the coil and the fourth lateral plate, and wherein a horizontal width of an inner surface of the third driving magnet is same as the horizontal width of the inner surface of the first driving magnet.

8. The lens driving device of claim 7, wherein the first driving magnet and the third driving magnet are symmetric with respect to an optical axis, and wherein the second driving magnet and the fourth driving magnet are symmetric with respect to the optical axis.

9. The lens driving device of claim 1, comprising an elastic member coupled with the bobbin, wherein the elastic member comprises a lower elastic member and an upper elastic member disposed above the lower elastic member, wherein the lower elastic member comprises two lower elastic members spaced apart from each other, and wherein the coil is electrically connected with the two lower elastic members.

10. The lens driving device of claim 9, wherein an electric power supplied from an external source through a terminal part of the circuit board is supplied to the coil through the two lower elastic members.

11. The lens driving device of claim 1, comprising a second magnet disposed on the bobbin and disposed at a position symmetrical to the first magnet with respect to an optical axis.

12. The lens driving device of claim 1, wherein the sensor is overlapped with the first magnet in the first direction, and wherein the first magnet is overlapped with the coil in the first direction.

13. The lens driving device of claim 12, wherein the first magnet is disposed between the coil and the bobbin in the first direction, and wherein the coil is disposed between the first magnet and the sensor in the first direction.

14. The lens driving device of claim 1, wherein the bobbin comprises a driving part coupling part formed by being recessed from an outer peripheral surface of the bobbin, and a first mounting part formed by being recessed more than a driving part coupling part from the outer peripheral surface of the bobbin, wherein the coil is disposed on the driving part coupling part of the bobbin, and wherein the first magnet is disposed on the first mounting part of the bobbin.

15. The lens driving device of claim 1, wherein a height of the first driving magnet is same as a height of the second driving magnet, and wherein a thickness of the first driving magnet is same as a thickness of the second driving magnet.

16. The lens driving device of claim 2, wherein the circuit board comprises six terminals disposed on an outer surface of the circuit board.

17. A camera module, comprising:

a printed circuit board;

an image sensor disposed on the printed circuit board;

the lens driving device of claim 1; and a lens coupled to the bobbin of the lens driving device and disposed at a position corresponding to the image sensor.

18. A mobile phone comprising the camera module of claim 17.

19. A lens driving device, comprising:

a base;

a cover member coupled with the base and comprising an upper plate and a lateral plate;

a bobbin disposed in the cover member;

a coil disposed on the bobbin;

a driving magnet disposed between the bobbin and the lateral plate of the cover member;

a first magnet disposed on the bobbin; and a sensor configured to sense the first magnet, wherein the lateral plate of the cover member comprises first and second lateral plates opposite to each other and third and fourth lateral plates opposite to each other, wherein the driving magnet comprises a first driving magnet disposed between the bobbin and the first lateral plate, a second driving magnet disposed between the bobbin and the third lateral plate, and a third driving magnet disposed between the coil and the second lateral plate, wherein each of the first driving magnet and the second driving magnet comprises an inner surface facing the bobbin, wherein a horizontal width of the inner surface of the first driving magnet is shorter than a horizontal width of the inner surface of the second driving magnet, and wherein the sensor is overlapped with the third driving magnet in a first direction perpendicular to the first lateral plate.

* * * * *